(12) United States Patent
Wang et al.

(10) Patent No.: US 11,757,951 B2
(45) Date of Patent: Sep. 12, 2023

(54) SYSTEM AND METHOD FOR CONFIGURING VIDEO WATCH PARTIES WITH GESTURE-SPECIFIC TELEMOJIS

(71) Applicant: Vizio, Inc., Irvine, CA (US)

(72) Inventors: William Wang, Irvine, CA (US); W. Leo Hoarty, Morgan Hill, CA (US)

(73) Assignee: Vizio, Inc., Irvine, CA (US)

( * ) Notice: Subject to any disclaimer, the term of this patent is extended or adjusted under 35 U.S.C. 154(b) by 0 days.

(21) Appl. No.: 17/828,673

(22) Filed: May 31, 2022

(65) Prior Publication Data

US 2022/0385701 A1    Dec. 1, 2022

Related U.S. Application Data

(60) Provisional application No. 63/194,607, filed on May 28, 2021.

(51) Int. Cl.
  *H04L 65/1093*    (2022.01)
  *H04N 21/4788*    (2011.01)
  (Continued)

(52) U.S. Cl.
  CPC .......... *H04L 65/1093* (2013.01); *G06F 3/017* (2013.01); *H04L 67/104* (2013.01);
  (Continued)

(58) Field of Classification Search
  CPC ... H04L 65/1093; H04L 67/104; G06F 3/017; H04N 21/43076; H04N 21/4316
  See application file for complete search history.

(56) References Cited

U.S. PATENT DOCUMENTS

| 8,922,489 B2 | 12/2014 | Chua |
| 8,928,589 B2 | 1/2015 | Bi |

(Continued)

FOREIGN PATENT DOCUMENTS

| CN | 102822773 A | 12/2012 |
| CN | 103518179 B | 10/2016 |

(Continued)

OTHER PUBLICATIONS

English translation of CN102707798B from Total Patent.

(Continued)

*Primary Examiner* — Bryan Y Lee
(74) *Attorney, Agent, or Firm* — Hansen IP Law PLLC

(57) ABSTRACT

Systems and methods for creating video watch parties are shown and described. Video and audio data indicative of the content being displayed on a plurality of smart TVs is compared to stored data in a content recognition database to determine what content is being viewed by each of a plurality of viewers at a given time. Viewers watching the same content are invited to become members of a watch party, and the televisions of those who accept the invitation are operatively connected to one another in a peer-to-peer network, enabling them to view the watch party content on a watch party screen that displays the watch party content and images or graphical icon representations of each other member of the watch party who is watching the content. Watch party participants can communicate with one another on the watch party display orally, using text messages in a text message area of the display, or by projecting emojis in the content region of other participants' displays.

20 Claims, 31 Drawing Sheets

(51) Int. Cl.
  *H04N 21/43* (2011.01)
  *G06F 3/01* (2006.01)
  *H04L 67/104* (2022.01)
  *H04N 21/431* (2011.01)
(52) U.S. Cl.
  CPC ... *H04N 21/4316* (2013.01); *H04N 21/43076* (2020.08); *H04N 21/4788* (2013.01)

(56) References Cited

U.S. PATENT DOCUMENTS

| | | | |
|---|---|---|---|
| 9,201,590 | B2 | 12/2015 | Kim et al. |
| 9,215,395 | B2* | 12/2015 | Herdy .............. H04N 21/42203 |
| 9,538,250 | B2* | 1/2017 | Moran ................ G06F 3/04817 |
| 9,547,438 | B2 | 1/2017 | Bromer |
| 10,429,944 | B2 | 10/2019 | Hebbalaguppe et al. |
| 10,635,171 | B2 | 4/2020 | Nakamura et al. |
| 10,698,587 | B2 | 6/2020 | Paek et al. |
| 11,107,490 | B1* | 8/2021 | Slotznick .............. H04M 3/568 |
| 2012/0274550 | A1 | 11/2012 | Campbell et al. |
| 2012/0295661 | A1 | 11/2012 | Kim et al. |
| 2014/0006997 | A1 | 1/2014 | Kim et al. |
| 2014/0028567 | A1 | 1/2014 | Park et al. |
| 2015/0172338 | A1* | 6/2015 | Moran .................... H04L 51/56 370/260 |
| 2022/0070524 | A1* | 3/2022 | Iyer .................... H04N 21/2393 |
| 2022/0132214 | A1* | 4/2022 | Felman ................. H04L 67/535 |
| 2022/0394328 | A1* | 12/2022 | Marten ............. H04N 21/4788 |

FOREIGN PATENT DOCUMENTS

| | | |
|---|---|---|
| CN | 103635869 B | 2/2017 |
| CN | 102707798 B | 4/2017 |
| CN | 105224069 B | 3/2019 |
| CN | 111857338 A | 10/2020 |
| EP | 3467707 A1 | 6/2018 |

OTHER PUBLICATIONS

English translation of CN102822773A from Total Patent.
English translation of CN103518179B from Total Patent.
English translation of CN103635869B from Total Patent.
English translation of CN105224069B from Total Patent.
English translation of CN111857338A from Total Patent.

* cited by examiner

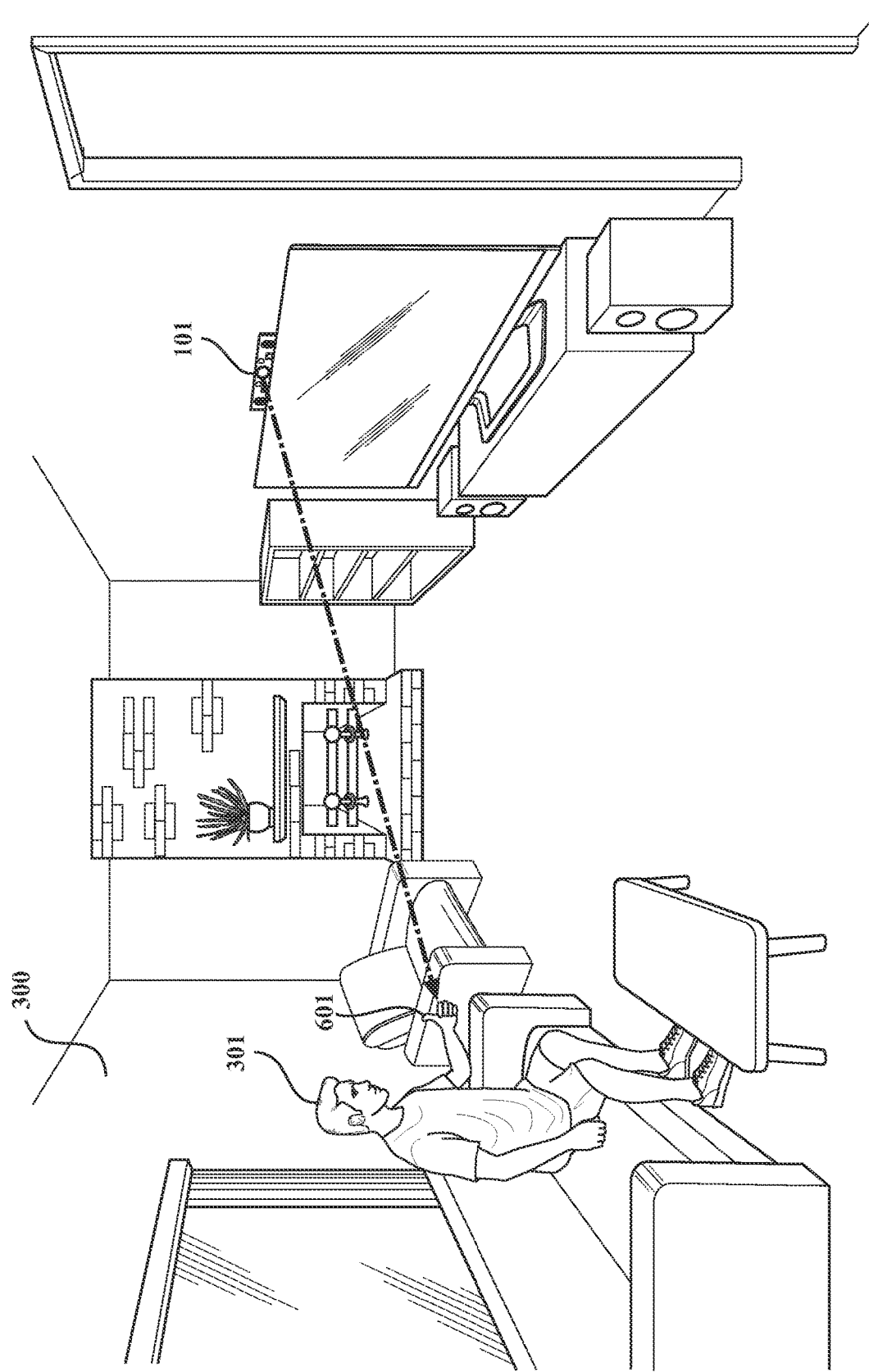

SYSTEM AND METHOD FOR CONFIGURING VIDEO WATCH PARTIES WITH GESTURE-SPECIFIC TELEMOJIS

CROSS REFERENCE TO RELATED APPLICATIONS

This application claims the benefit of U.S. Provisional Application No. 63/194,607, filed on May 28, 2021, the entirety of which is hereby incorporated by reference.

FIELD

The present disclosure relates to configuring watch parties in which groups of people remotely located from one another view the same content, and more specifically to methods and systems for generating animated emojis on the screens of the watch party viewers based on hand and/or aural gestures of one of the party participants.

BACKGROUND

People have long enjoyed congregating to view sporting events, movies, or TV shows and to share their reactions to such content in real time and in person. Persons located remotely from one another have generally been unable to enjoy this activity and have been limited to communicating orally, by e-mail, or by text message while concurrently viewing the same content. These limitations are significant because in most cultures, facial expressions and hand gestures are an important component of human communications. While facial expressions are a component of most person-to-person audiovisual interaction, hand gestures are hard to capture. In the 1990's, at a time when person to person computer communication was purely text, emoticons were developed that combined letters and special characters to help communicate gestures and emotions. Novel fonts, such as Microsoft Wingdings, introduced more sophisticated characters and subsequently, mobile phone carriers in Japan implemented emoji sets for their users and their 12×12 pixel format grew in popularity world-wide. With the introduction of newly designed Unicode-based emojis in 2010, emojis became more complex and popular, such that they are now a significant component of many informal electronic communications, especially in social media. It would be desirable to provide a system and method for allowing viewers watching shared content to communicate their reactions to that content with one another via emojis that are displayed as overlays on the shared content. Thus, a need has developed for a system and method that addresses the foregoing issues.

SUMMARY

In accordance with a first aspect of the present disclosure, a method of operating a video watch party is provided. The method comprises transmitting an invitation to join a video watch party to respective smart televisions of at least two members of a viewer's friends list, selecting members from among the at least two members of a viewer's friends list who (i) accepted the invitation, and (ii) are currently viewing a common program, and transmitting to each selected member's respective smart television an instruction to simultaneously display the common program together with a representation of all selected members. In certain examples, each watch party member may communicate by text displayed on their TV display simultaneously with the common program. In accordance with the same or other examples, a system is provided comprising a computer executable processor and a non-transitory computer readable medium having computer executable instruction stored thereon, which when executed by the processor, performs the foregoing method steps of the first aspect. In accordance with the same or other examples, the members of the watch party may trigger the display of telemojis on the other members displays, including by selecting the telemojis from a menu and by executing a visual or aural gesture that corresponds to the telemoji and a display action for the telemoji. In accordance with the same or other examples, the respective televisions of the selected members are operatively connected to one another as part of a peer-to-peer network.

In accordance with a second aspect of the present disclosure, a method of operating a video watch party is provided. The method comprises identifying a plurality of viewers who are currently viewing a same piece of video content on respective smart TVs, home theater displays, or TVs/displays together with a set-top box (all three are referred to as TVs herein) and creating a peer-to-peer network comprising the respective smart TVs of the plurality of viewers. In certain examples, the method comprises transmitting invitations to join the video watch party to members of a viewer's friends list wherein the viewer's friends list comprises the plurality of viewers who are currently viewing the same piece of content. In accordance with certain examples, an instruction is transmitted to the respective TVs to display representations of each of the plurality of viewers on each viewer's respective television while the same piece of video content is displayed on each viewer's respective television. In the same or other examples, an instruction is transmitted to the respective TVs to display communications between the plurality of viewers on each viewer's respective TV. In the same or other examples, the displayed communications may include telemojis displayed as an overlay on the same piece of video content. In the same or other examples, a system for operating video watch parties is provided which comprises a computer processor operatively connected to a smart television display and a non-transitory computer readable medium having computer executable instructions stored thereon which, when executed by the compute processor, perform the method steps of the second aspect.

In accordance with a third aspect of the present disclosure, a method of participating in a video watch party is provided. The method comprises displaying a piece of video content on a first smart television being viewed by a first viewer, accepting an invitation to join a video watch party with other watch party members who are watching the piece of video content on respective smart televisions, and displaying communications between the first viewer and the other watch party members while also displaying the piece of video content on the first smart television. In certain examples, the method further comprises receiving at least one selected from visual gesture data and aural gesture data from a viewer and displaying a graphical object corresponding to the received at least one selected from visual gesture data and aural gesture data on the first smart television and on the respective smart televisions of the other watch party members. In the same or other aspects, a non-transitory computer readable medium having computer executable instructions stored hereon is provided, and when executed by a computer processor, the computer executable instructions perform the method of the third aspect.

BRIEF DESCRIPTION OF THE DRAWINGS

FIG. 6B illustrates the system of FIG. 1 detecting a "thumbs up" hand gesture made by the viewer on the couch;

DETAILED DESCRIPTION

The disclosed systems and methods provide a means to dynamically detect groups of people viewing the same content on smart viewing devices, such as smart televisions or other computing devices such as desktop and laptop computers or mobile phones and create "watch parties" by configuring peer-to-peer networks of the viewing devices. The peer-to-peer network enables the watch party members to directly communicate with one another via text, audio, emojis or other graphical objects that are displayed on the viewing device simultaneously with the content the watch party members are collectively viewing. In certain examples, picture-in-picture windows may provide real time video feeds of each watch party member on the display In certain examples, the viewing devices are smart televisions (i.e., televisions with computer processor(s), program modules, RAM and storage) with the ability to project graphical icons, called "telemojis", which are animated emojis displayed on a television screen or other video monitor. In other examples, a telemoji is selected based on visual and aural gestures made by the viewer as well as the content selections the viewer makes. In preferred embodiments, the systems and methods used detect the identity of a current viewer through visual and/or aural identification and then utilize data indicative of the content selections they make to access and present in a picture-in-picture window on the TV display, or on a separate mobile device, the choice of graphical icons that can be selected by the viewer to project onto a video scene on the TV monitor. In certain examples, the entrance of the viewer into the area in which a television is located is determined by system's motion detectors, and the viewer's entrance is used to change an operational state of a camera and/or a microphone operatively connected to the television such that the camera and/or microphone are only powered on when a viewer has entered the area.

As used herein, the term "module" refers to a set of computer executable instructions stored on a non-transitory computer readable medium. The steps carried out by the execution of the instructions by a processor may be referred to as a "process." Thus, each of the various processes described herein are understood to have a corresponding module and to be associated with a computer processor that can execute those computer executable instructions.

Figure 1:
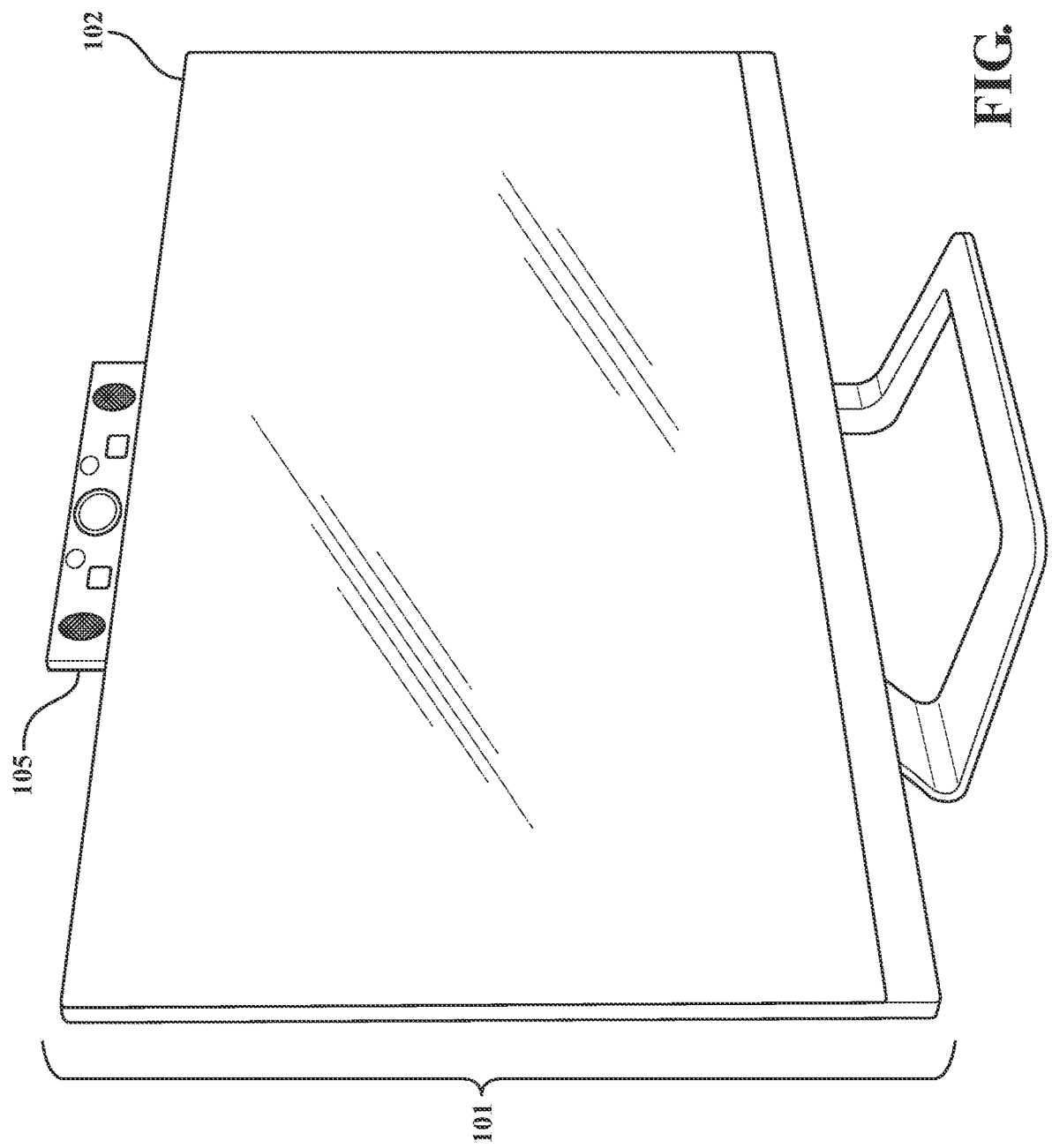
FIG. 1 is an exterior view of a smart television system configured to participate in video watch parties in accordance with the present disclosure.
Figure 2:
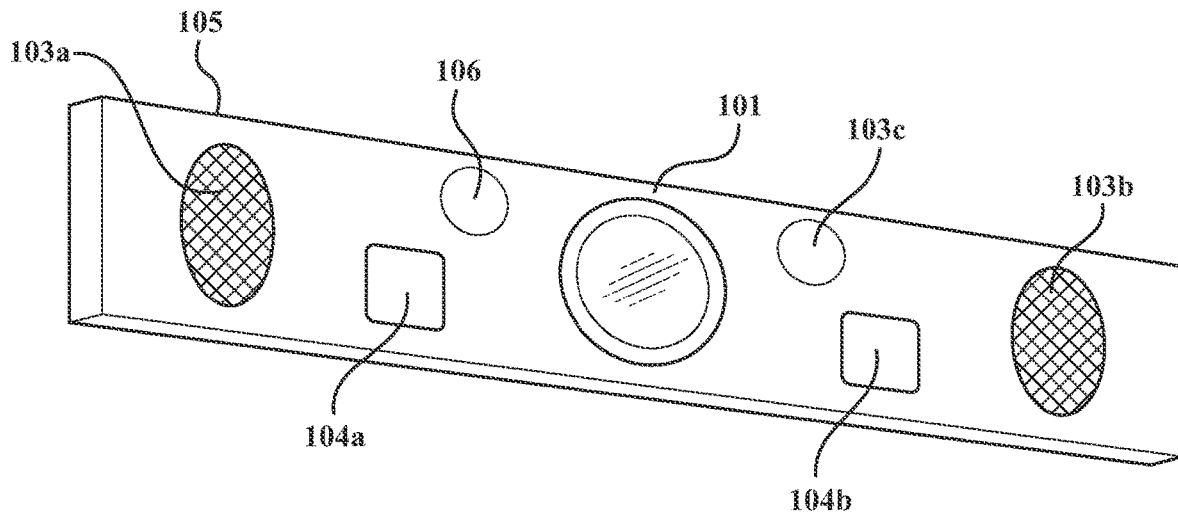
FIG. 2 shows the external sensory components of the system of FIG. 1.

FIG. 1 depicts a smart television system 100 configured interact with a remote server to identify a plurality of television viewers viewing the same content concurrently and to associate with the viewers in a peer-to-peer mesh network as a "video watch party". Smart television system 100 is also configured to selectively track and display telemojis corresponding to viewer gestures and aural gestures (i.e., oral utterances). Smart television system 100 comprises a television display 102 (including the housing, screen, and internal processing components) as well as external components such as various sensors mounted on apparatus bar 105. The apparatus bar 105 of the TV system 100 is further depicted in FIG. 2, showing, in this embodiment, an arrangement of the various sensors that are operatively connected to smart television system 100; including one or more video cameras 101, a microphone array 103a and 103b, a motion sensor array 104a and 104b and which, in other embodiments, may also contain other supporting technology, such as a tally light 106.

Figure 4:
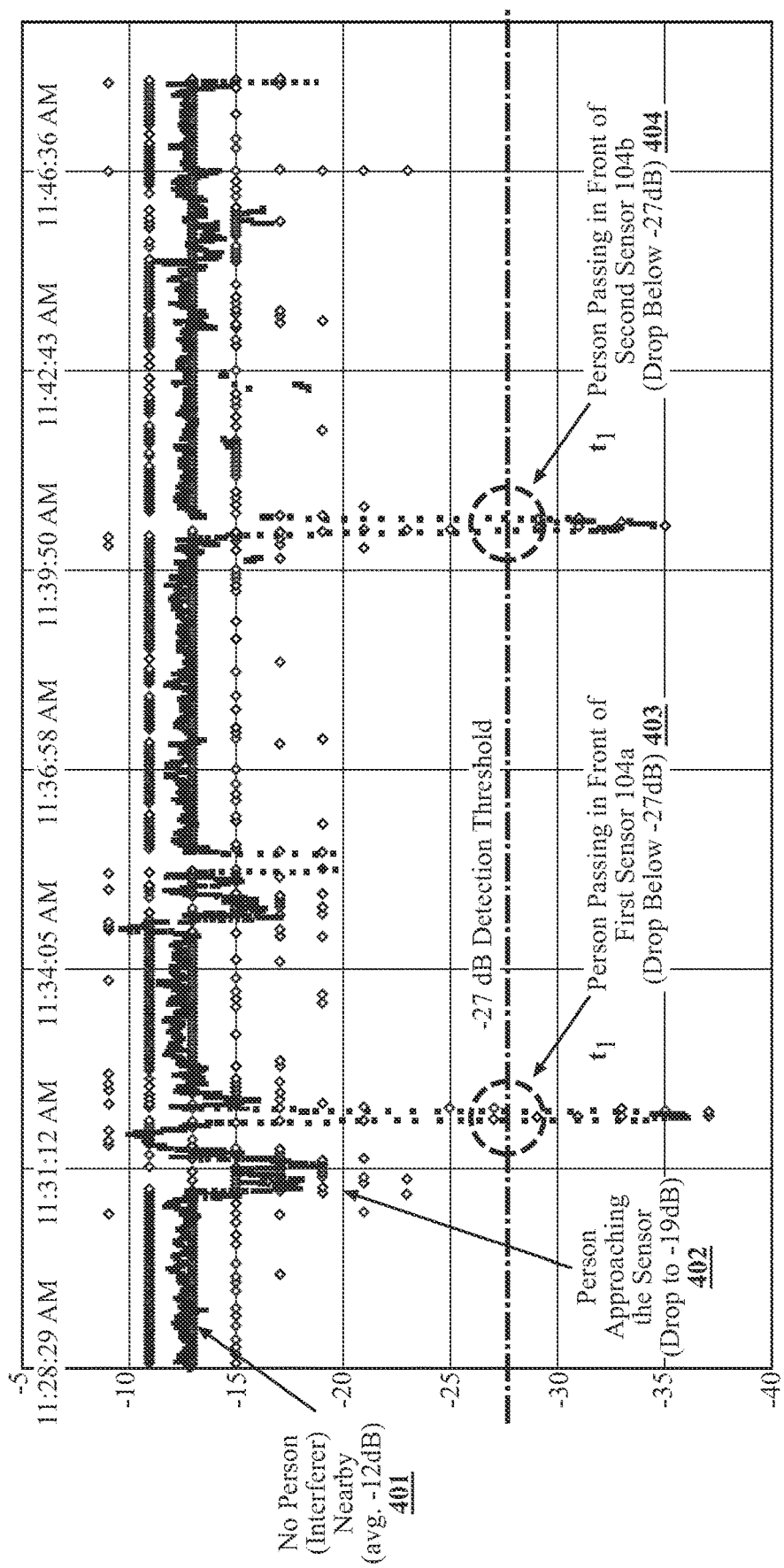
FIG. 4 is a signal chart for the motion sensors of FIGS. 1-2 responding to interference generated by a person passing in front of it.

In preferred examples, the smart television system 100 of FIG. 1 detects the entrance of a viewer into the area in which the smart television system 100 is located, in order to selectively activate at least one camera (e.g., camera 101) and/or at least one of microphones 103a, 103b. When a person 301 enters the room to watch TV display 102, they are initially detected by one or more motion sensors such as 104a and 104b (in this embodiment shown as mounted on the apparatus bar 105). The motion sensors 104a and 104b generate respective signals 403, 404 (FIG. 4) when motion occurs proximate to them. The use of multiple motion sensors 104a and 104b provides signals that may be temporally and spatially related to one another (based on the locations of sensors 104a and 104b relative to one another and to the room entrance) in order to indicate if a television viewer is entering or leaving the room in which smart TV system 100 is located. Their respective signals 403, 404 are fed to the TV processor system 1400 (FIG. 13) of the smart TV system 100 which executes computer readable instructions stored on a non-transitory computer readable medium to determine the presence of the viewer 301 and whether that viewer is entering or leaving the room. Then, following any detection of motion corresponding to entry into the smart television system 100 viewing area, the disclosed system changes the operational state of one or more video camera(s) 101 to ON to identify persons within the TV viewing area, and in certain examples (described further below), ascertains their reactions to content being displayed on TV display 102. The change in operational state may comprise providing power to one or more video cameras 101 and/or activating their record functions. The motion sensor system comprising mounted sensors 104a and 104b beneficially provides the ability to power on the one or more video cameras 101 to identify the person or persons in front of the TV but only when motion is sensed in the vicinity of the TV display 102, rather than having the video camera 101 always be on, which could have the potential of causing the viewers discomfort regarding the possibility of unwanted surveillance or otherwise perceived as an invasion of privacy.

Figure 3A:
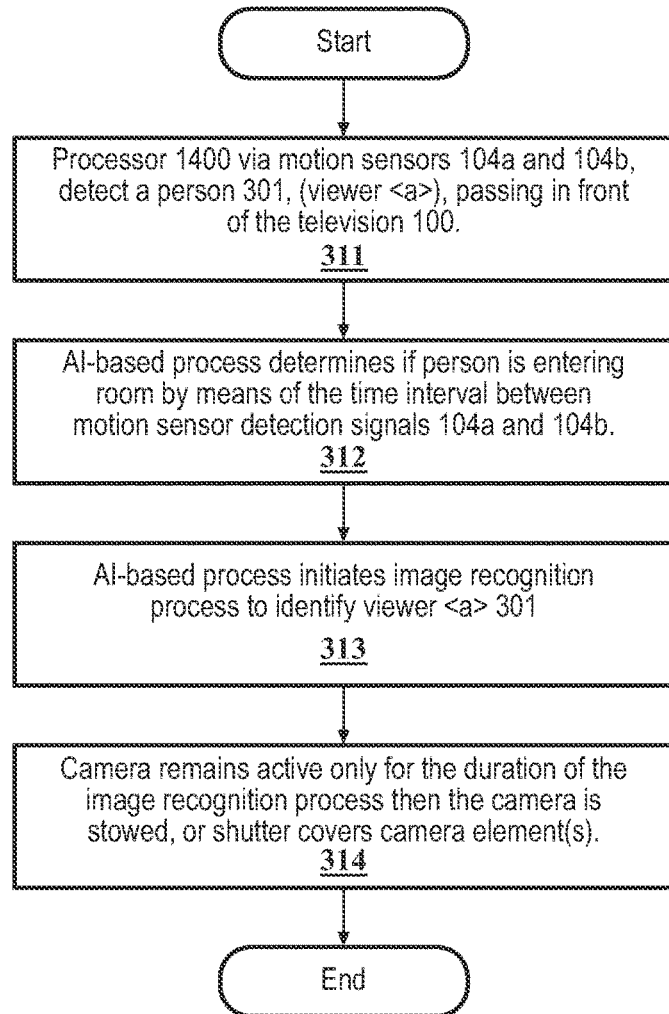
FIG. 3A depicts a method of detecting a person entering a room to watch television.
Figure 3B:
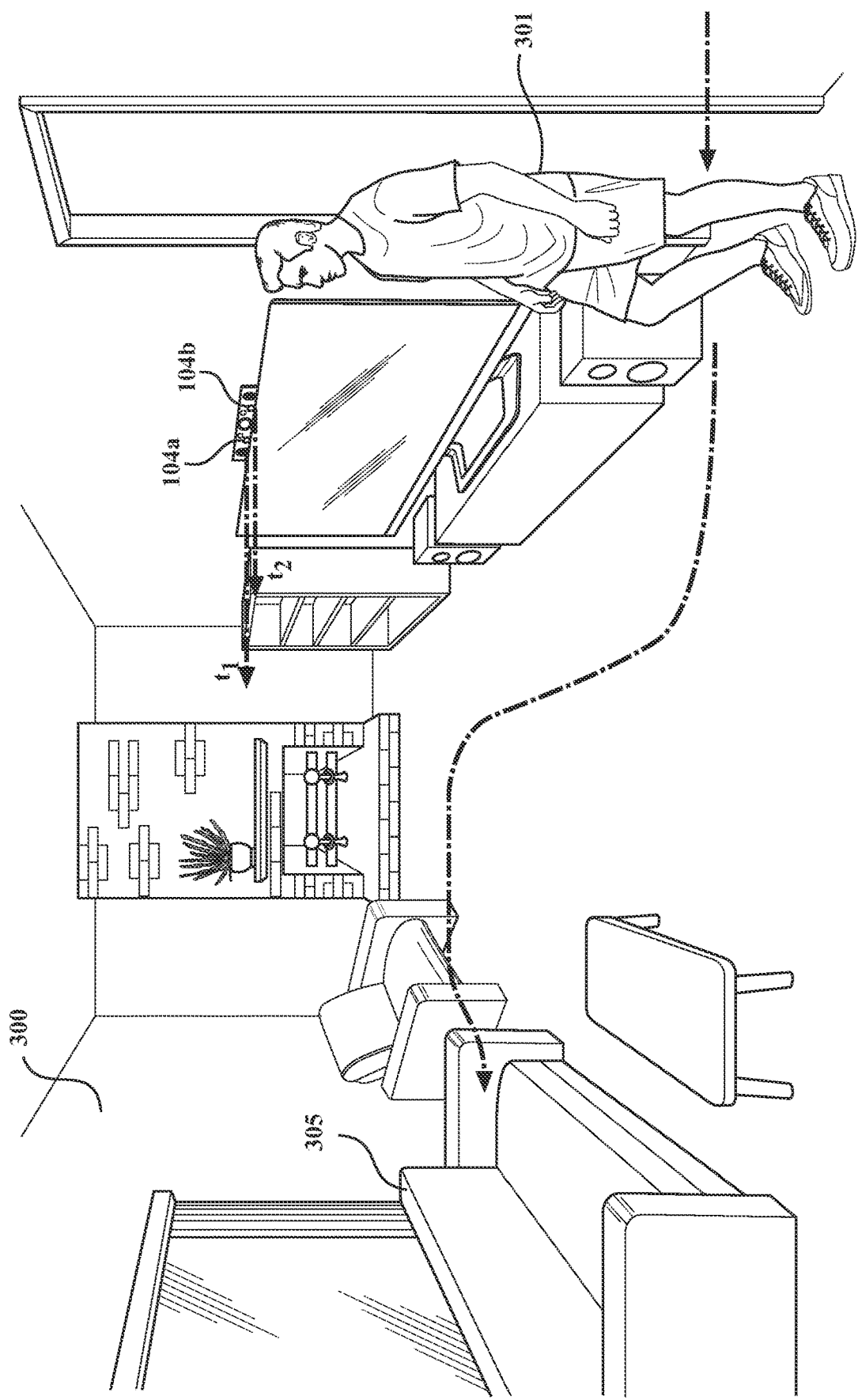
FIG. 3B is an overhead view of an example living room, equipped with the disclosed system of FIG. 1 as it detects and identifies an individual entering the room.

FIG. 3B illustrates a person 301 entering room 300 to smart TV system 100. FIG. 3A depicts a method of detecting the entry of person 301 into room 300 and determining the identity of person 301. TV processor system 1400 (which may comprise a plurality of processors), via motion sensors 104a and 104b, detects the person 301 passing in front of TV display 102 (step 311). An artificial intelligence ("AI") motion analysis module 1503 (FIG. 14) comprises steps carried out by executing a set of computer executable instructions stored on a non-transitory computer readable medium. The steps comprise determining that a person is entering the room by, in part, the degree of interference with, as well as the measurement of the time interval between the motion detection signals 403 and 404 generated by the motion sensors 104a and 104b (step 312). In step 312 each motion sensor 104a and 104b detects the individual in the manner indicated by signals 403 and 404 in FIG. 4. In preferred examples, the AI motion analysis module 1503 then sends data to a controller (not shown in FIG. 3B) operatively connected to a power source for camera 101 to power it on.

In step 313 an AI-based viewer visual identification & gesture recognition module 1507 is then invoked by the automated viewer processor module 1506 to identify the person 301 once they are seated anywhere in the TV viewing area (step 313), where such TV viewing area is typically, but in no way limited to, the approximate dimensions of an ordinary home living room or TV room. Camera 101 is then powered down after the image recognition process is completed (step 314).

Figure 5A:
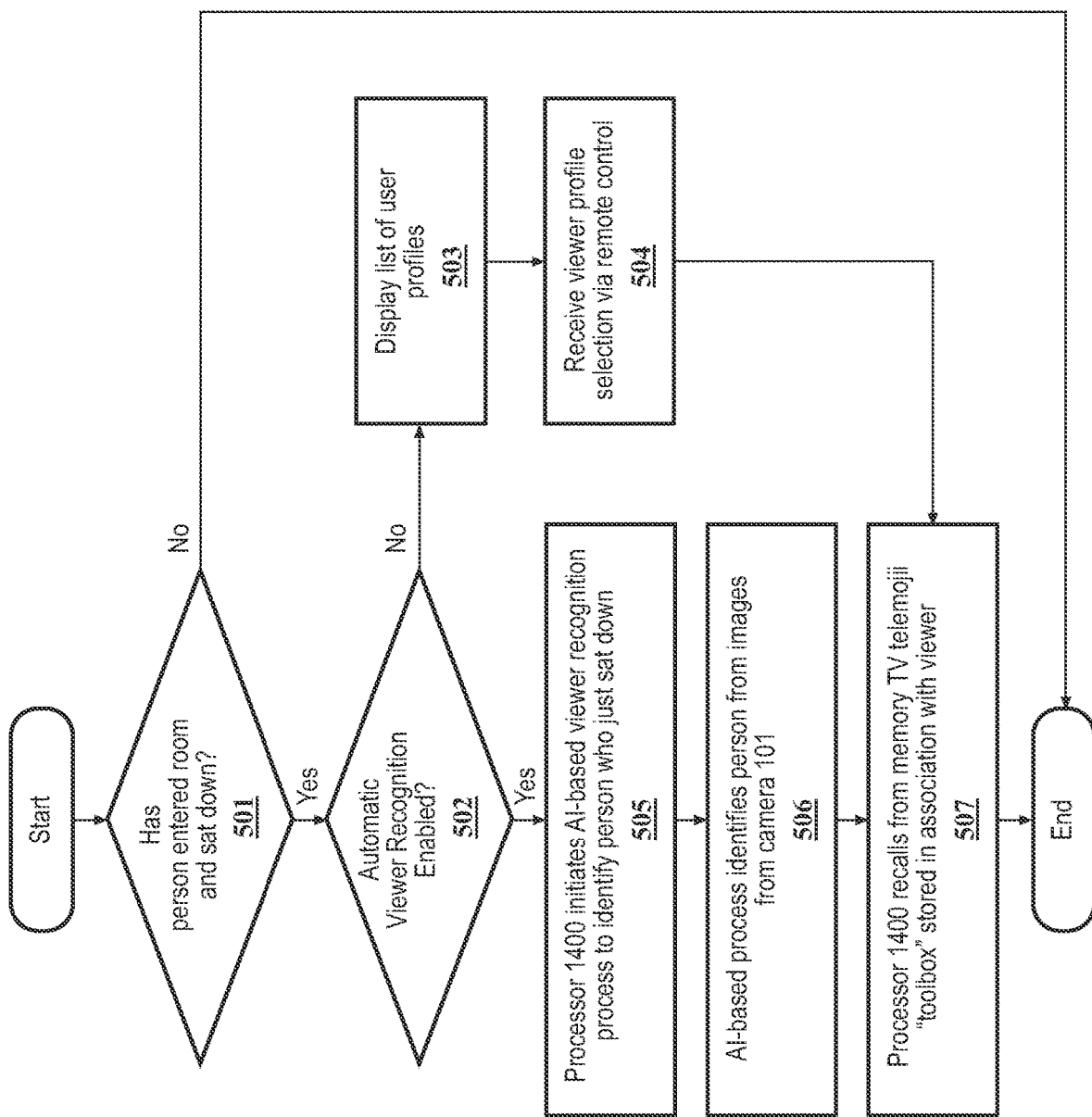
FIG. 5A depicts a method of identifying a person seated in front of the television of FIG. 1 and accessing a set of telemojis associated with the identified person.
Figure 5B:
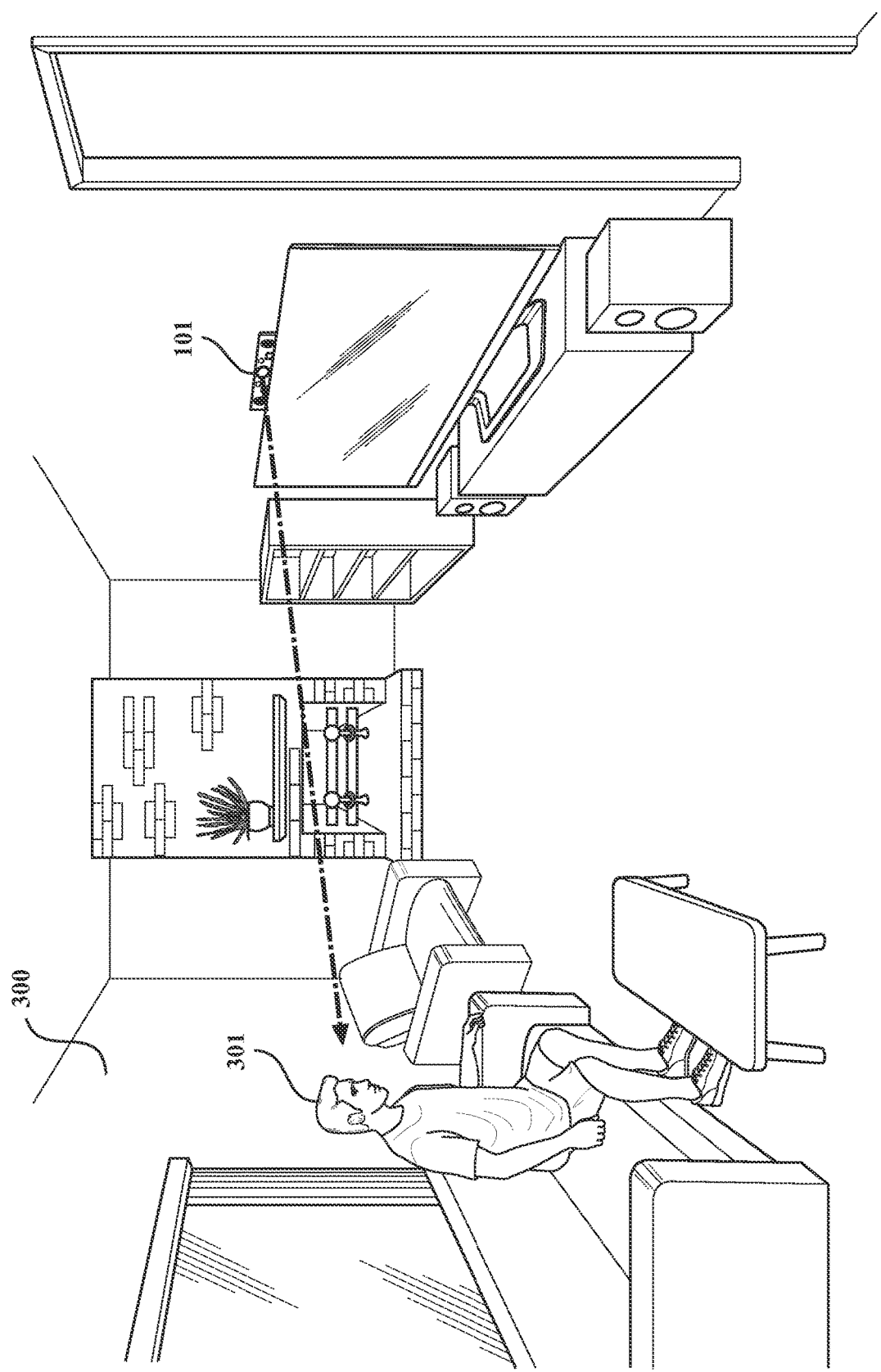
FIG. 5B depicts the room of FIG. 3 with the individual who previously entered now seated on a couch across a room from the smart television system of FIG. 1.

FIG. 5A provides a method of detecting the identity of a person entering room 300 and of associating a "toolkit" of telemojis and display actions for those telemojis with select visual and aural gestures made by the viewer. The toolkit is viewer specific and comprises a set of on-screen graphical elements and display actions that can be chosen by the viewer to appear within a video scene by superimposition of the graphic element in the video frame buffer 1405 of the TV. A "display action" describes the manner in which the graphical element is displayed, such as statically in a select location or dynamically by traversing a desired path across the display 102 of smart television system 100.

In FIG. 5A, the system first determines whether viewer 301 is now seated on couch 305 facing TV camera system 101 (step 501). In step 502 TV processor system 1400 determines whether automatic viewer recognition is enabled. If it is enabled (step 502 returns a value of YES), control proceeds to step 505. If automatic viewer recognition is not enabled, control transfers to step 503 and TV processor system 1400 displays a list of user profiles on the television display 102. The viewer selects his or her profile from the list of profiles, preferably using a remote control or mobile device, and in step 504 TV processor system 1400 receives that selection.

If in step 502 viewer recognition is enabled, control transfers to step 505 and TV processor system 1400 initiates viewer visual identification and gesture recognition module 1507 to identify the person who is seated on couch 305. In certain examples, the viewer visual identification and gesture recognition module 1507 comprises steps performed by executing a set of computer-executable instructions stored on a non-transitory computer readable medium.

In step 506 the viewer visual identification and gesture recognition module 1507 receives one or more images of the seated viewer from camera 101 and compares the received one or more images to stored viewer images in a viewer identification database (not shown). The viewer identification database comprises records that include viewer names and image data fields, which are digital representations of the viewer images. Using known facial recognition algorithms, the computer executable instructions determine a degree of similarity between the captured images and the database viewer images, and if the similarity is within a particular threshold, the viewer named is in the corresponding viewer name field is deemed to be the viewer whose image(s) were captured by the camera 101.

Having identified the seated viewer, in step 507 TV processor system 1400 then recalls from memory the preferred graphical elements (e.g., the telemoji toolbox) of the now identified viewer. The stored telemoji may include not only the static graphical element but the display action associated with it. For example, one telemoji may be a smiley face that traverses a path across display 102. An on-screen graphics database 1508 is provided in smart television system 100 and defines the catalog of telemojis the viewer can select from. On-screen graphics database 1508 includes the files that define the telemojis (e.g., jpg files) and their display actions. When viewer visual identification and gesture recognition module 1507 identifies a telemoji corresponding to a captured gesture, it then issues a command to the processor 1408 to display the telemoji in accordance with its associated display action (e.g., flying across the screen, bouncing, colliding with a target, etc.). In the case of a watch party, video watch party app 1622 transmits a message to the televisions of other watch party members to display the telemoji in accordance with the associated display actions on their displays as well.

Alternatively, or in addition to using facial recognition, the viewer may provide an aural identification of his or her identity by speaking into mic1 103*a* or mic2 103*b*. The received sound signals are then converted to digital data in mic beam forming & audio processing module 1504 and compared to reference digital data in a viewer aural identity database (not shown). The identified gesture is then used by the automated viewer processor module 1506 (FIG. 14) receives viewer identity data from viewer visual identification & gesture recognition module 1507 and/or viewer aural identification module 1505. If aural and visual identification data are used, automated viewer visual identification & gesture recognition module 1507 preferably determines if they are consistent or displays a message on TV display 102 if they are not.

In certain examples, while participating in a video watch party, viewer 301 provides an indication of the viewer's reaction to the television program then being displayed by causing a telemoji corresponding to his or her reaction to be displayed on his or her screen and those of other watch party members. In certain examples, the indication is at least one of a visual indication and an aural indication. In the case of a visual indication, viewer visual identification and gesture recognition module 1507 compares captured visual gesture images captured by camera 101 to those stored in a visual and aural gesture database (not shown) to identify the gesture. The identified gesture is then used by video watch party app 1622 to identify the telemoji that is stored in association with the gesture and to display the telemoji on display 102 in accordance with the display action(s) associated with that telemoji. Video watch party app 1622 then sends a message to the televisions of other members of the watch party to display the telemoji on their displays in accordance with the telemoji's associated display actions. With respect to the telemojis described previously, it should be noted that the graphical element has display action attributes such as a path of travel around a video scene among other attributes that is part of the data object shared among members of the group and stored locally in the memory of each smart TV of each member. During the watch party, the decoded actions of a watch party member, such as initiating the flight of an on screen 'telemoji' are sent to every other member of the watch party to cause the software system of each member's smart TV to overlay the same telemoji in the same position(s) on the TV screen as the initiator. For example, Viewer 4 (picture-in-picture window 1704) in FIG. 20A could launch a telemoji that appears on his or her screen and which is also launched on the screens of other members who appear in picture-in-picture windows 1701, 1702, 1703, and 1705. In this manner, the members of the watch party can share voice comments as well as communicate via on screen actions, thereby creating a shared event.

It should be obvious to the skilled person that if smart TV 100 were equipped with a video camera, a real-time video feed of the participant could be shared with the other members within picture-in-picture windows 1701-1705. Likewise, for TVs without a video camera, a watch party group member's mobile device or laptop could be used for the same purpose.

In the case of an aural indication, viewer aural identification module 1505 compares digitized aural gestures received from mic beam forming & audio processing module 1504 to those stored a visual aural and gesture database (not shown) to identify the gesture the closest match (assuming the similarities exceed a defined threshold) is considered the correct gesture. Microphone beam forming is a process of phase modulation of audio signals from two or more microphones in order to create the strongest reception of sound thereby providing the best signal for further audio processing. This beam forming process is well known to the art. Video watch party app 1622 queries an internal table in memory to determine which telemoji is associated with the gesture and issues a command to TV processor system 1400 to display the telemoji on display 102 and sends a message to the televisions of other watch party members to similarly display the telemoji on their displays.

Figure 6A:
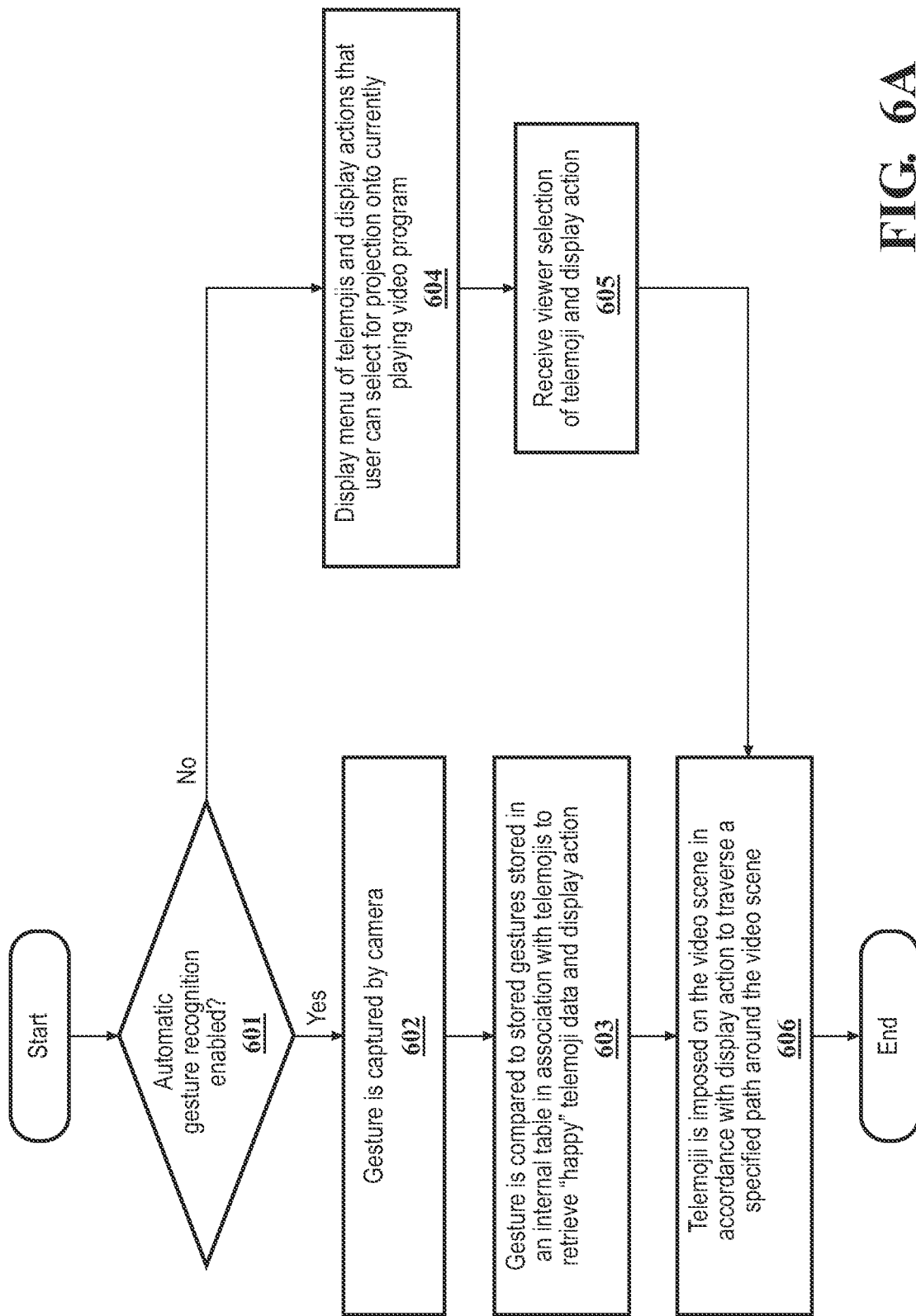
FIG. 6A depicts a method of detecting a viewer gesture and displaying, animating, and superimposing on the television display of FIG. 1 a telemoji stored in association with the viewer and the detected gesture.
Figure 14:
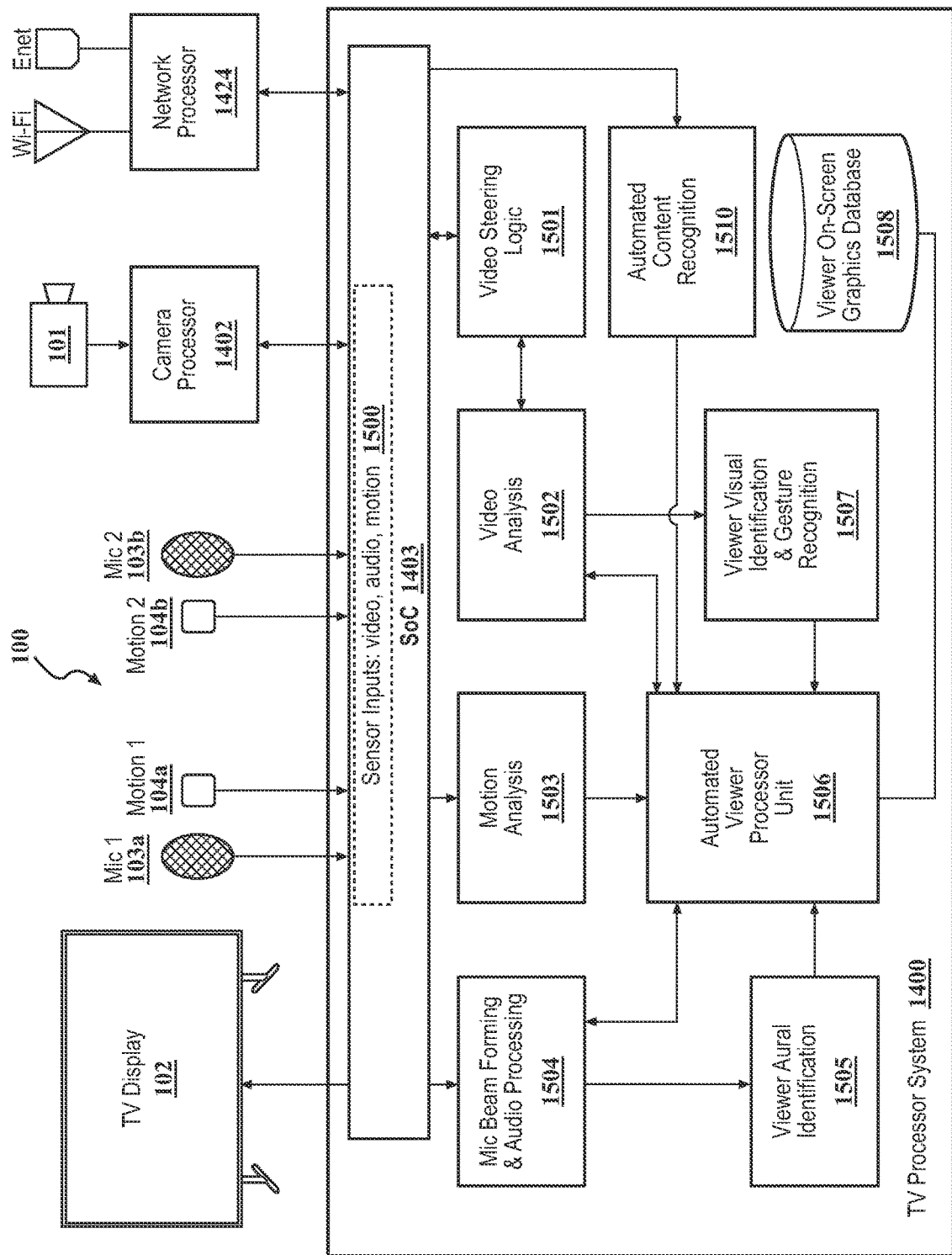
FIG. 14 is a block diagram of the processing modules of the television of FIG. 1 which perform viewer identification, TV viewing data acquisition, and gesture decoding to make available on-screen graphic elements from a viewer on-screen graphics database.

FIG. 6B shows viewer 301 providing a hand gesture indicating approval ("thumbs up"), and FIG. 6A depicts a method for determining the type of telemoji and its display actions when superimposed upon the video scene based on the gesture of FIG. 6B. In step 601 a determination is made as to whether automatic gesture recognition is enabled. If it is not, control transfers to step 604 and a menu of telemojis is displayed. The telemoji is a graphic element, and in some cases, has an associated display action. For example, a "thumbs up" gesture might be associated with a "thumbs up" graphic element that flies across the display 102 overlaid on the content being viewed. The menu entries are preferably selectable by scrolling with a remote control and pushing "enter" when the desired graphic element/display action combinations are selected. In step 602 video watch party app 1622 executes a command to TV processor system 1400 to display the telemoji on display 102 and sends a message to the televisions of other watch party members to also display it on their displays (the respective smart TVs of other watch party members have the same or substantially similar telemojis from which to select in their viewer on-line graphics database 1508 (FIG. 14). In some cases, the user will also provide an indication of a target of the emoji (e.g., a referee in a sports program who is the target of a bucket of Gatorade.)

Figure 20A:
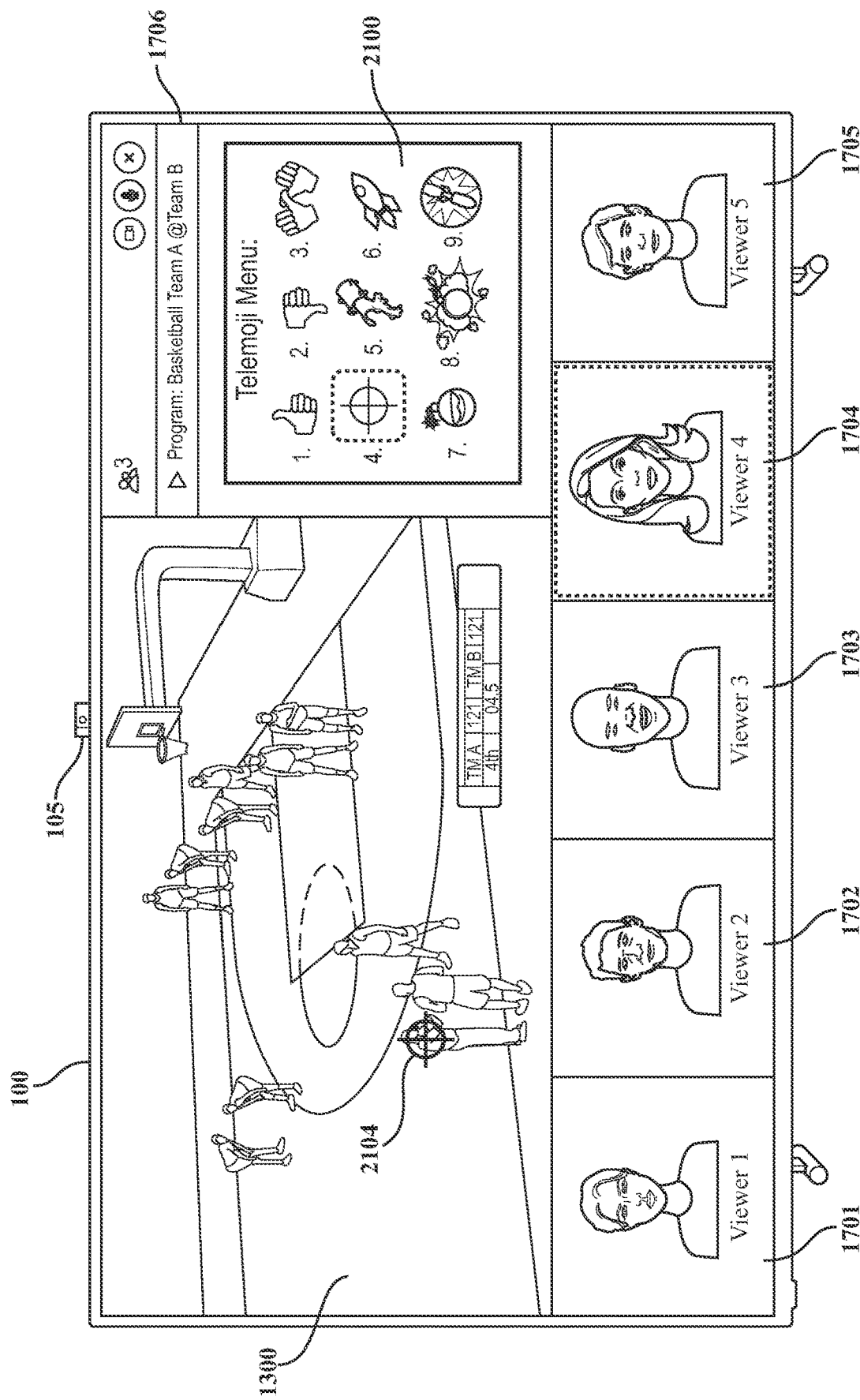
FIG. 20A is an example frame of a video watch party showing a target telemoji positioned over a referee to indicate that the referee is an intended target of another emoji.

In certain examples, the watch party participant who wishes to apply a certain action of a telemoji to a person or object within the video frame first issues a verbal command such as "show telemojis", or alternatively, invokes the telemoji pop-up menu via a function key on the remote control upon which the video watch party app 1622 displays a list of telemojis 2100 in a window superimposed on display 102 proximate the content region 1300. In one embodiment, each telemoji item on the list has a number associated with it that the user then chooses to cause the object to then appear in the content region 1300 as illustrated in FIG. 20A.

Figure 20B:
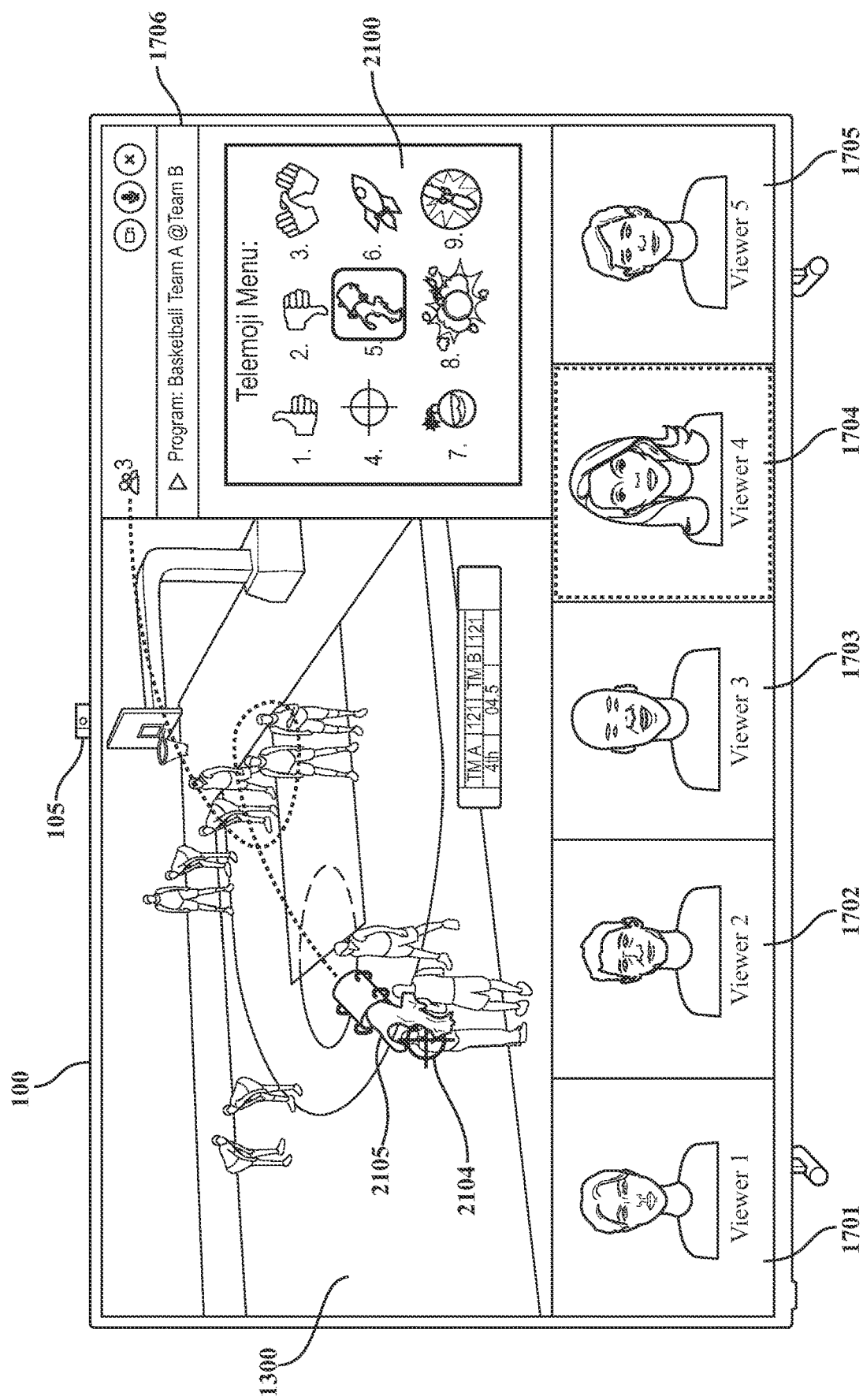
FIG. 20B is an example frame of the video watch party of FIG. 20A showing a telemoji launched by one member of the watch party using gestures corresponding to the dumping of a bucket of Gatorade on a referee.

In one example, the watch party user, Viewer 4 (represented by the contents of picture-in-picture window 1704), positions the target icon 2104 where desired to set the screen location of the telemoji. If the smart television system 100 is equipped with a video camera, the user may point to the target object on the television screen with a hand gesture. The camera system 101 of smart television system 100 will then triangulate the pointing finger to a relative position on the TV screen. The user then moves their finger to obtain the exact desired position for the target icon 2104. Alternatively, the telemoji icon can be positioned by means of the up, down, left, right arrows on the television remote control. In the example of FIG. 20A, the user has moved the target icon 2104 telemoji over the game referee. If the television system is equipped with image recognition, the target icon 2104 will then track (move with) the referee as the referee moves about the game area. Otherwise, the user must manually track the image of the referee using the remote control of the TV. In either case, the user can then select another telemoji such as number 5 of the telemoji set 2100 which will then cause that image to appear in the main video area and to fly to the targeted object (the referee) and then dump its contents on the target as illustrated in FIG. 20B.

If automatic gesture recognition is enabled in step 601, the viewer makes a visual gesture that is captured by camera 101 and/or an aural gesture captured by microphones 103a/103b in step 602. In step 603 the captured gesture is compared to gestures that are stored in an aural and visual gesture database by viewer aural identification module 1505 or viewer visual identification and gesture recognition module 1507, respectively, to identify the gesture. If the captured gesture is visual, it may comprise a single frame of video data or sequence of frames that collectively define a dynamic gesture (e.g., waving a hand). A statistical comparison is made between the captured and stored gestures. The stored gesture that is the closest fit (assuming it meets a specified minimum threshold of similarity) is deemed a match. Also in step 603, video watch party app 1622 (FIG. 15) receives data indicating the stored gesture and queries an internal table that associates gestures and telemojis to select the corresponding telemoji. In step 606 video watch party app 1622 issues a command to TV processor system 1400 to display the telemoji as an overlay on the displayed program in accordance with the telemojis associated display action. Video watch party app 1622 will also transmit a message to the televisions of the other watch party members instructing their processors to display the selected telemoji on their displays.

Figure 7A:
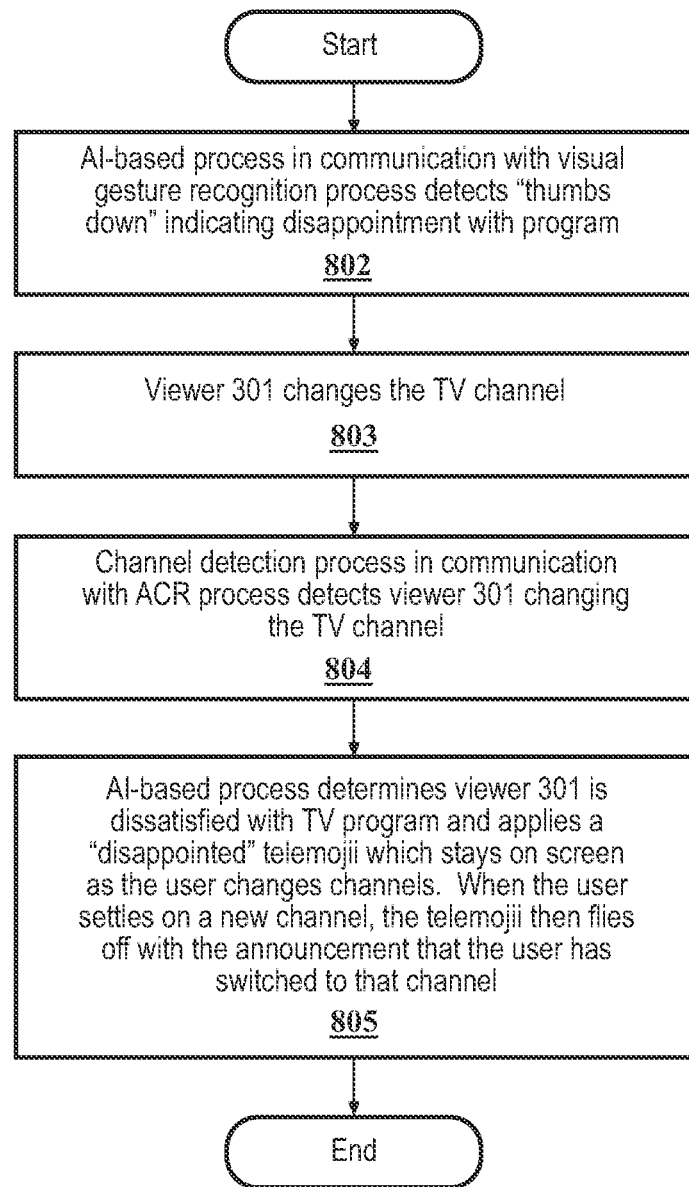
FIG. 7A depicts a method of displaying, animating, and superimposing an appropriate telemoji on a television display of a video watch party member based on another viewer's gesture and his or her changing of the channel away from the channel broadcasting shared content to a video watch party.
Figure 7B:
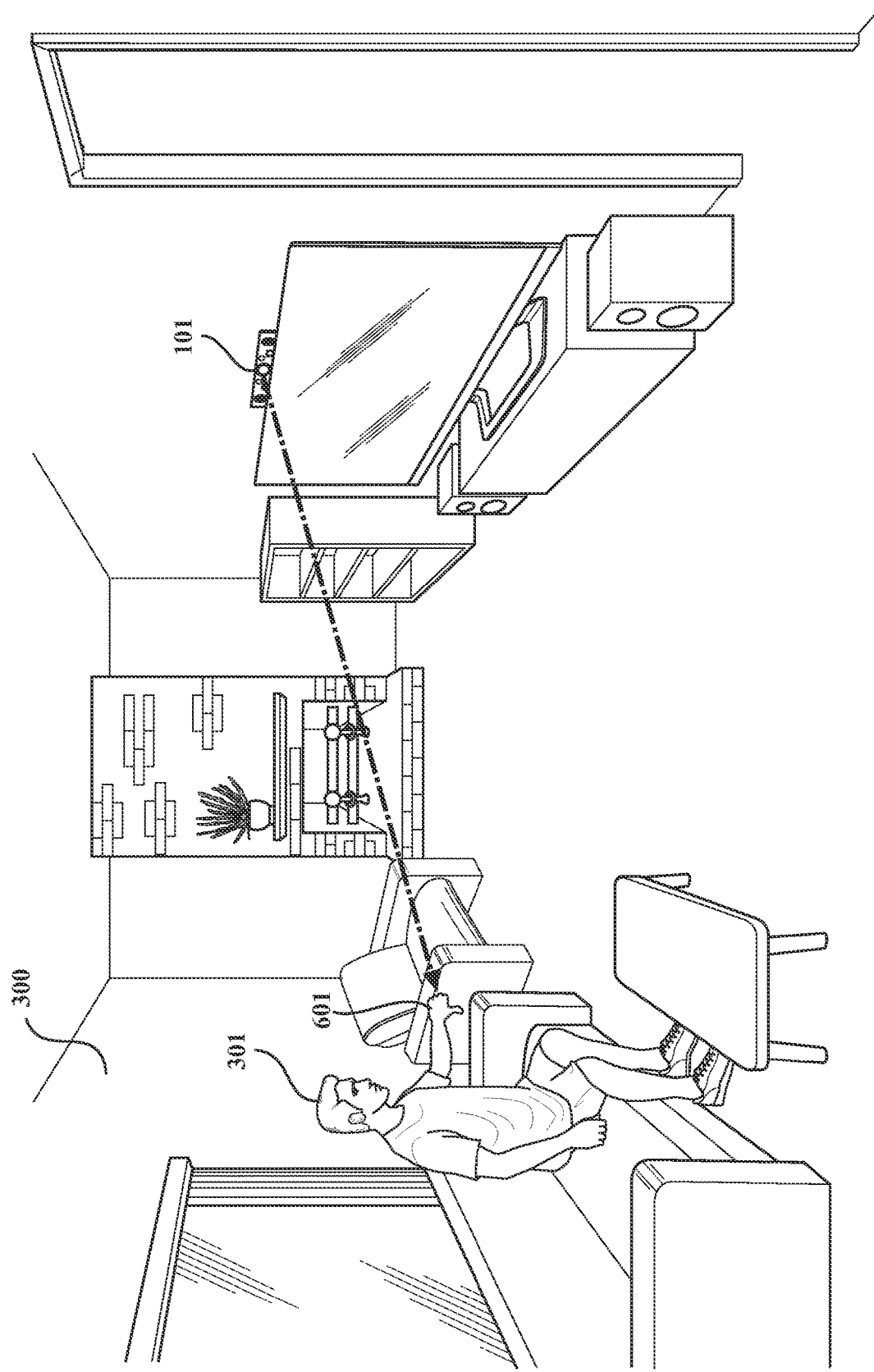
FIG. 7B illustrates the system of FIG. 1 detecting a "thumbs down" gesture made by a viewer.

The automated viewer processor module 1506 of this disclosure is capable of more advanced interpretations of many gestures that are more complex than a binary yes/no reaction. In certain examples, the viewer's 301 disapproval is determined based on both a gesture and on the viewer's changing (or not changing) of the currently displayed program. In accordance with such examples, and as shown in FIG. 7A, viewer visual identification & gesture recognition module 1507 detects the disapproval (e.g., "thumbs down") gesture (step 802) and ACR module 1510 detects the user leaving the displayed program by changing the channel or otherwise switching the programming being viewed on smart television system 100 (steps 803-804). Automated viewer processor module 1506 receives data indicative of the gesture from viewer identification & gesture recognition module 1507 and data indicative of the displayed program change from automated content recognition process 1510 and determines that viewer 301 is dissatisfied with the initially displayed TV program. In the embodiment where the viewer is a member of a watch party, the video watch party app 1622 issues an instruction to TV processor system 1400 to display the telemoji simultaneously on the TV displays of the other members of the watch party with a graphic banner or other graphic element superimposed or trailing the telemoji announcing the viewer 301's new channel or program choice. Any watch party viewer who chooses to switch the channel that viewer 301 has selected, will automatically form a new watch party associated with viewer 301. Those watch party members who chose to not switch TV channels will remain in the original watch party group.

In order to facilitate this watch party member channel identification process, the ACR process of matching server & service coordinator 1600 provides current channel information for each watch party member to the TV app support module 1605 which relays the current channel information to the video party app (including video watch party app 1622 in the case of TV display 102) of each watch party TV System (including TV System 100).

In certain examples, the automated viewer processor module 1506 will provide different gesture data to video watch party app 1622 depending on whether channel change data is received either alone or in combination with gesture data. In accordance with certain examples, a changing or non-changing of a channel or program is also treated as a viewer gesture and may be associated with the display of a particular graphic element using a particular display action. The changing of a channel may be treated as a gesture stored in memory by video watch party app 1622 in association with particular telemojis and is preferably fixed, i.e., not customizable by the viewer. However, such customization is possible. In addition, the video watch party app 1622 will receive data from automated viewer processor module 1506 indicating that a channel has been changed and will select telemojis based on whether such data has been received. As an example, if a viewer makes a disapproval gesture and no channel change data has been received, a frowny face emoji may traverse display 102 and those of other watch party members whereas if channel change data has been received, a frowny face may traverse the display with a trailing banner identifying the new channel being viewed by the viewer. If channel change data has been received without an accompanying disapproval gesture, a banner may traverse the screen (without the frowny face) indicating the new channel being viewed. In additional examples, the telemoji selection may be based not only on a viewer gesture, but also, based on the genre of content being viewed. For example, a thumbs up gesture executed during a sporting event may trigger the display of a telemoji having the colors of the viewer's favorite team or bearing the name of the team, whereas a thumbs up gesture executed during a movie may simply trigger a smiley face emoji. FIG. 8B illustrates the system of FIG. 1 receiving a "thumbs up" gesture made by viewer 301 while watching a sporting event, and FIG. 8A depicts a method of determining an appropriate telemoji and display action based on the hand gesture of FIG. 8B and the genre of the displayed program.

Figure 8A:
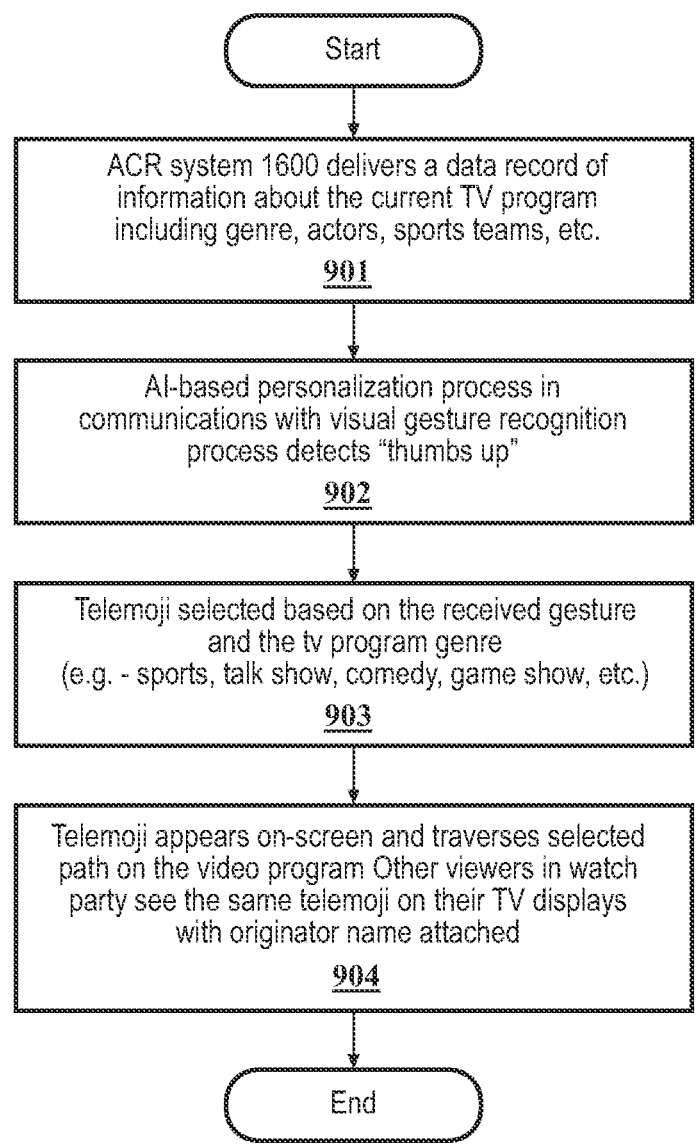
FIG. 8A depicts a method of displaying, animating, and superimposing a telemoji on the television display 100 of FIG. 1 based on a detected user hand gesture and a genre of content being viewed by the viewer.
Figure 8B:
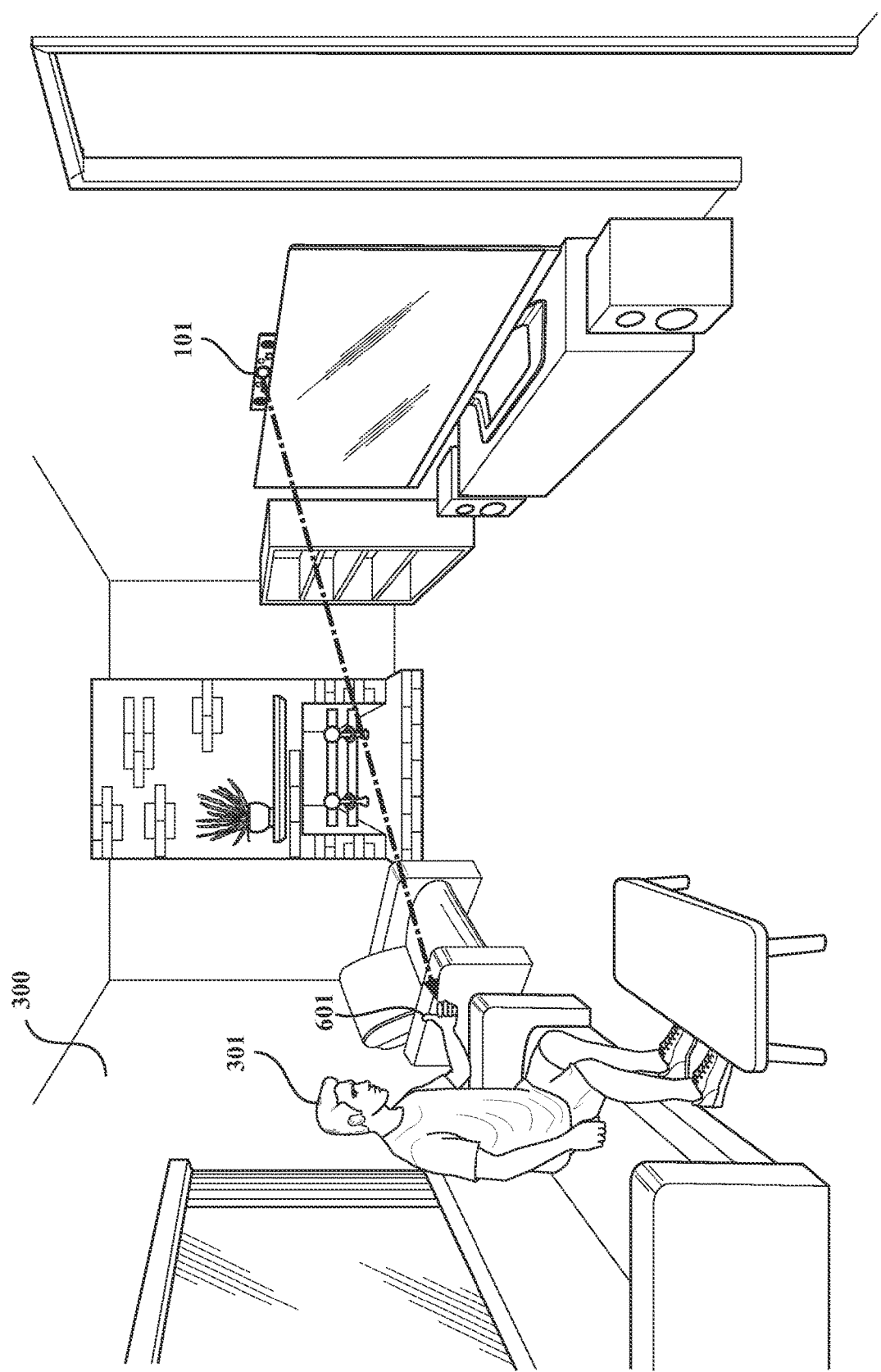
FIG. 8B illustrates the system of FIG. 1 detecting and receiving a "thumbs up" gesture made by a viewer.

In accordance with the method of FIG. 8A, viewer visual identification and gesture recognition module 1507 receives gesture data corresponding to the "thumbs up" gesture. Step 901. In step 902 visual identification and gesture recognition module 1507 compares a captured gesture (e.g., captured image or audio) to those in a visual and aural gesture database (not shown) and identifies a stored gesture that corresponds to the capture gesture. In step 903 video watch party app 1622 receives the stored gesture data and uses the stored gesture data to query an internal table to identify a telemoji corresponding to both the gesture and the genre. Video watch party app 1622 then issues a command to TV processor system 1400 in step 904 to display the telemoji on display 102 while also sending a message to the televisions of other watch party members to display the telemoji on their displays.

Figure 9A:
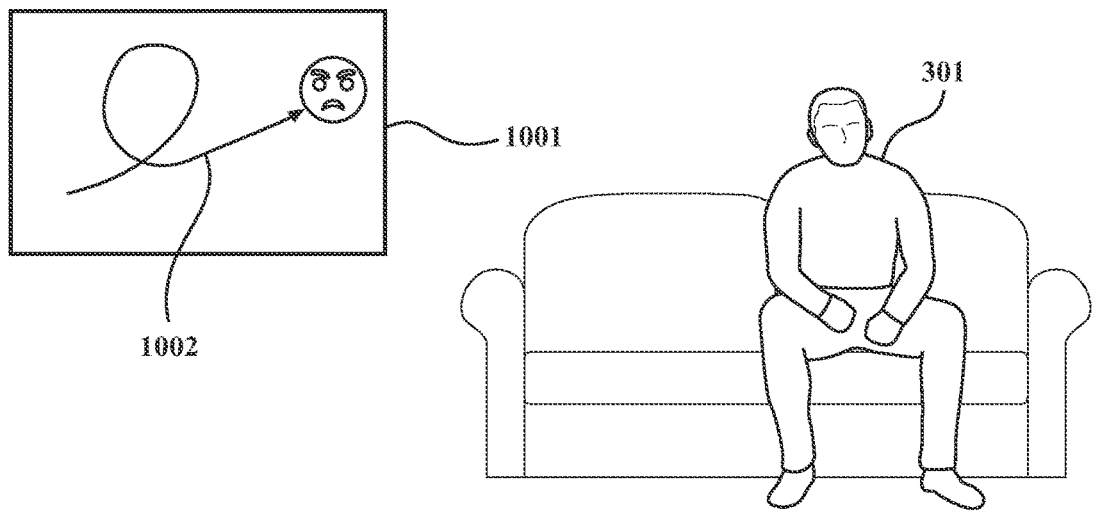
FIG. 9A depicts a telemoji caster using hand gestures to create and animate a telemoji which is displayed to others in a video watch party.
Figure 9B:
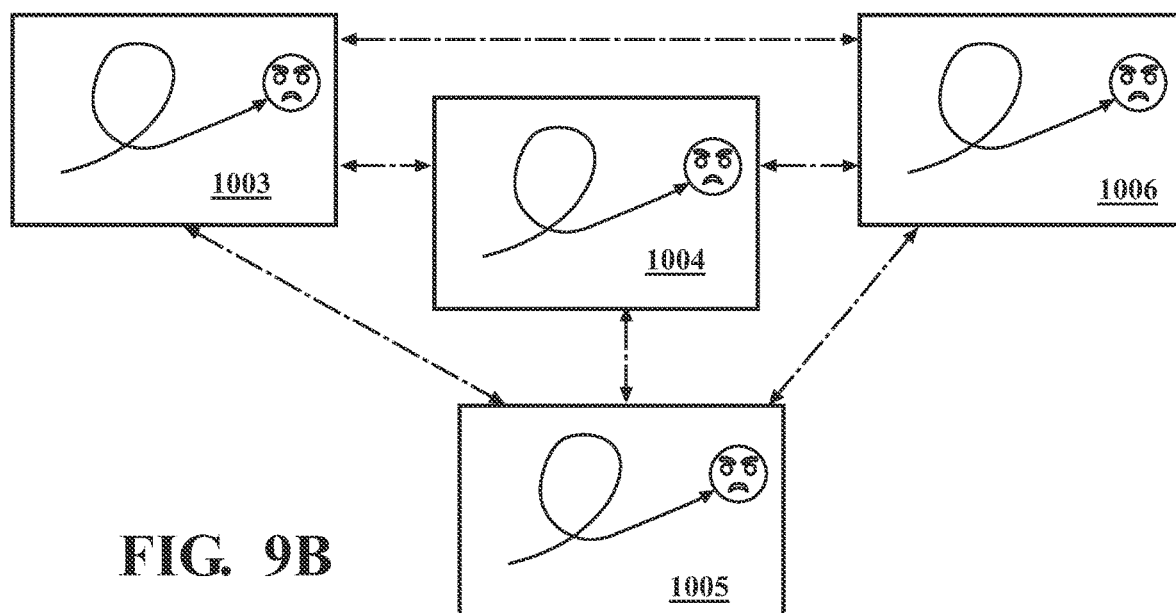
FIG. 9B depicts the telemoji of FIG. 9A as displayed to other members of the watch party.
Figure 10A:
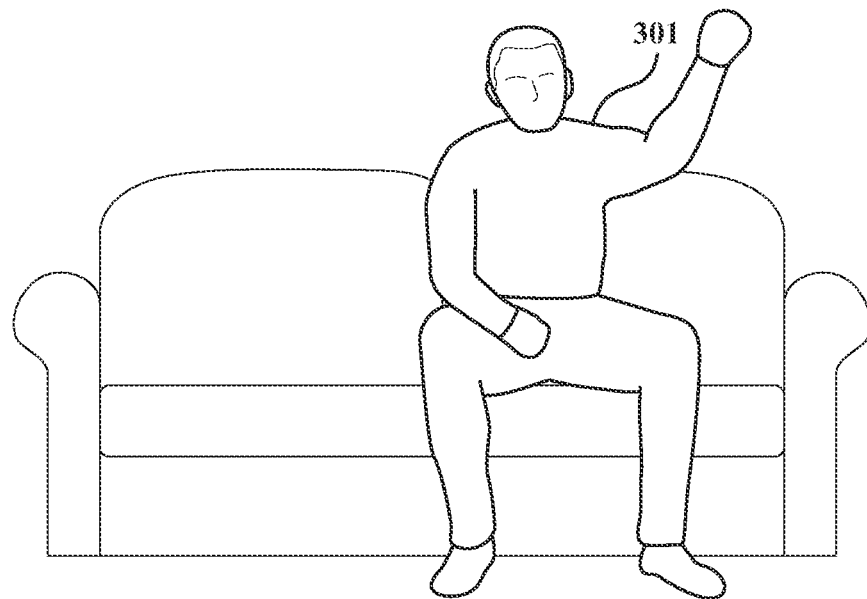
FIG. 10A depicts a telemoji caster gesturing to cause a telemoji to fly on television displays being viewed by other video watch party members.
Figure 10B:
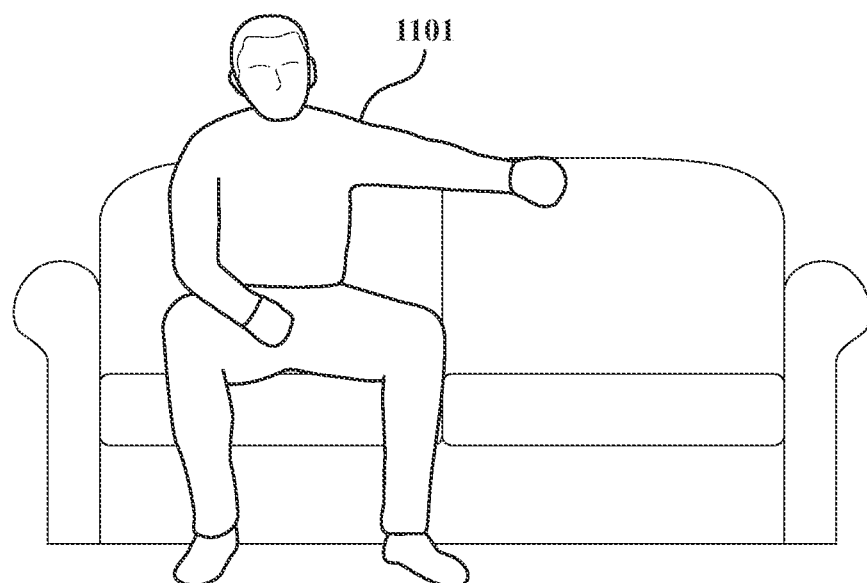
FIG. 10B depicts another member of the watch party of FIG. 10A gesturing to steer or deflect the animated telemoji of FIG. 10A from the path corresponding to the caster's gesture.

FIG. 9A depicts a telemoji 1001 and a trajectory 1002 initiated by viewer 301 and seen in FIG. 9B by watch party members 1003 to 1006. This figure depicts simultaneous viewing of the telemoji on the TV displays of each watch party member. In one embodiment, the telemoji and its trajectory across a video scene are shared from the originator's smart TV, such as viewer 301, with each smart TV in the watch party by means of a mesh network utilizing each TV's internet connectivity. Each telemoji is synchronously launched on each watch party TV and then follows a predefined trajectory before disappearing off screen at after a predetermined duration. FIG. 10A depicts viewer 301 controlling the trajectory of telemoji 1001 with a corresponding control gesture by viewer 1101 shown in FIG. 10B then deflecting or otherwise affecting telemoji 1001. In another embodiment, a telemoji and its trajectory that is shared with a watch party group by one viewer can interact with at telemoji shared by another viewer thereby creating in real-time an altered trajectory.

Figure 11A:
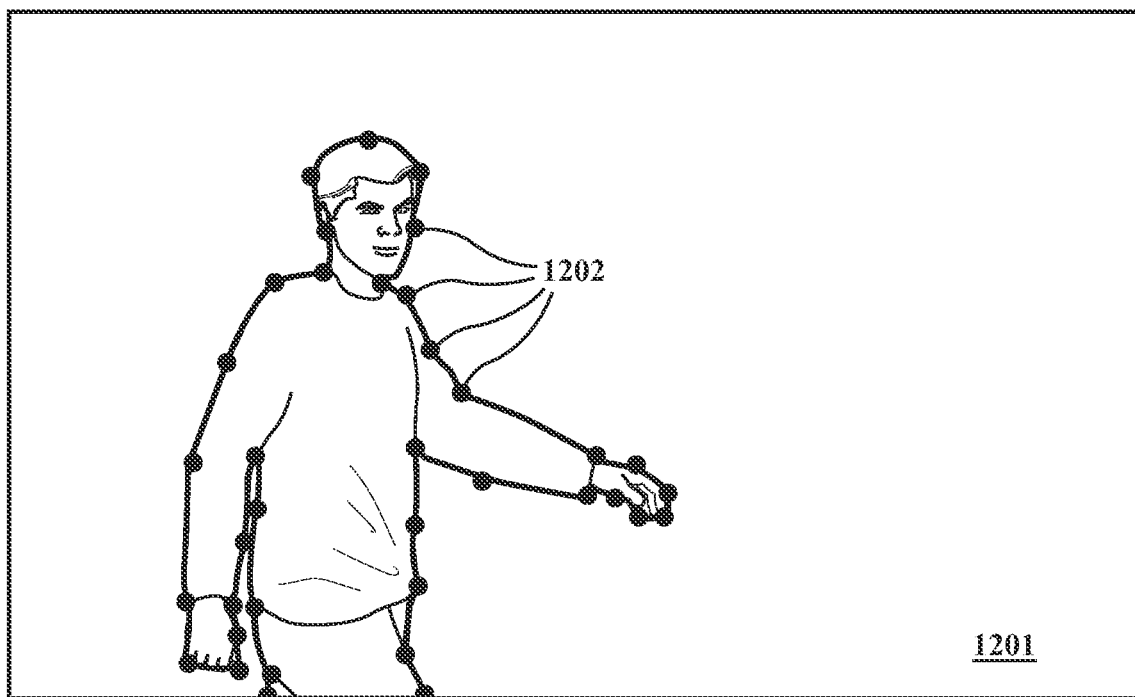
FIG. 11A Depicts the detection of boundaries and edges of an on-screen target of a telemoji towards whom the telemoji of FIG. 10A travels.
Figure 11B:
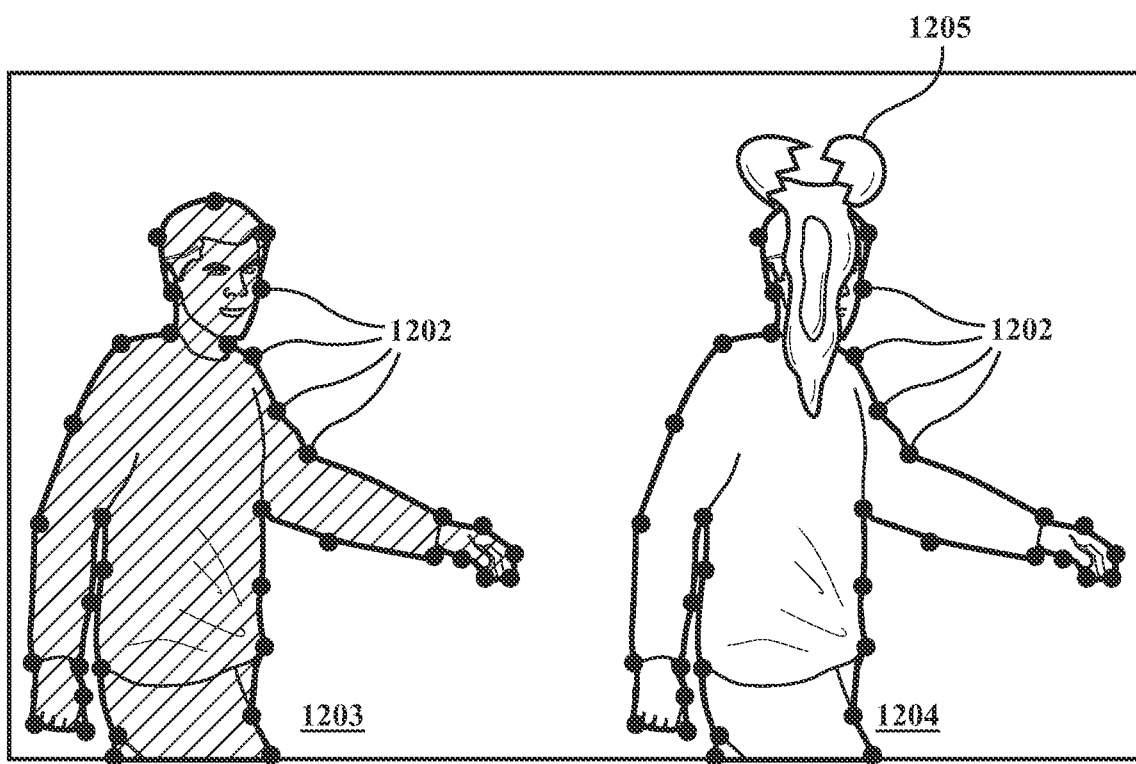
FIG. 11B depicts the target of FIG. 11A following the collision of a telemoji with an on-screen target using the boundaries and edges of the target shown in FIG. 11A.
Figure 12A:
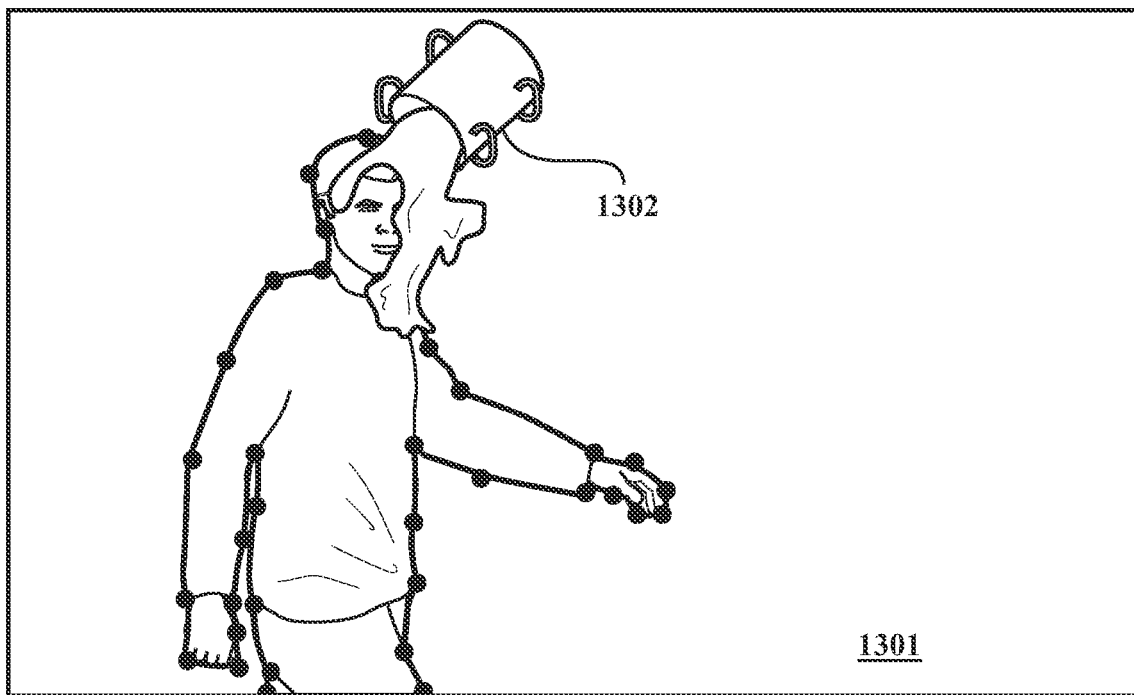
FIG. 12A is an exemplary depiction of an animated telemoji interacting with an on-screen target.

Telemojis may also target persons or objects appearing in the watch party content. To accomplish this, the outline of the target and its movement are preferably tracked. FIG. 11A depicts the TV processor system 1400 applying a known edge detection using artificial intelligence to find the outline of a FIG. 1201 within a video scene on the TV display. Once the outline of the figure is obtained, the algorithm of TV processor system 1400 continues to track the figure as it moves within the TV scene. FIG. 11B depicts the TV processor system 1400 modifying the detected FIG. 1201. Such modifications in one embodiment includes tinting the FIG. 1201 or simulating a telemoji "egg" 1205 striking and then dripping down the FIG. 1204. In yet another embodiment, FIG. 12A illustrates the use of the detected and defined FIG. 1301 having a bucket of liquid 1302 poured upon it much like the popular Gatorade shower at a sports event.

Figure 12B:
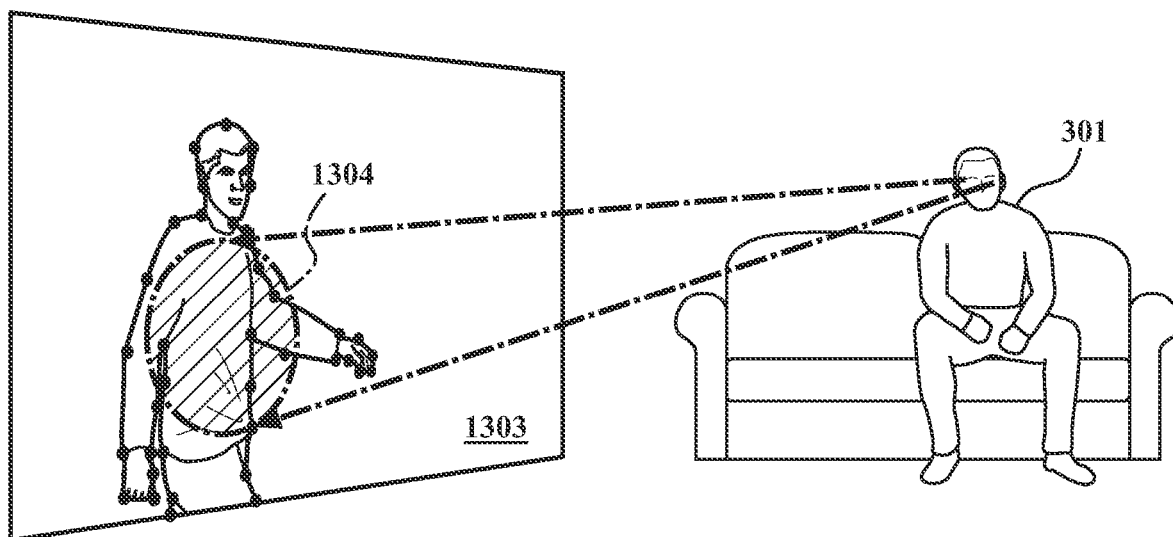
FIG. 12B depicts a viewer's selection of an on-screen target based on the viewer's gaze.

FIG. 12B depicts the TV processor system 1400 using the camera 101 of FIG. 1 to determine the point of focus of viewer 301 within a program scene by the application of "gaze detection" AI processes. Once the point of focus is determined, a circle of display pixels is increased in luminance and moved with the eye motion of the viewer 301 thereby tracking the viewers 301 gaze allowing the viewer 301 to target telemojis to a target of interest within a television scene. As an example, a user may execute a gesture to display a Gatorade bucket telemoji and may then focus on the target on the display 102. The video watch party app 1622 would then read the tracked coordinates and use them to define a target for the Gatorade bucket.

Figure 19:
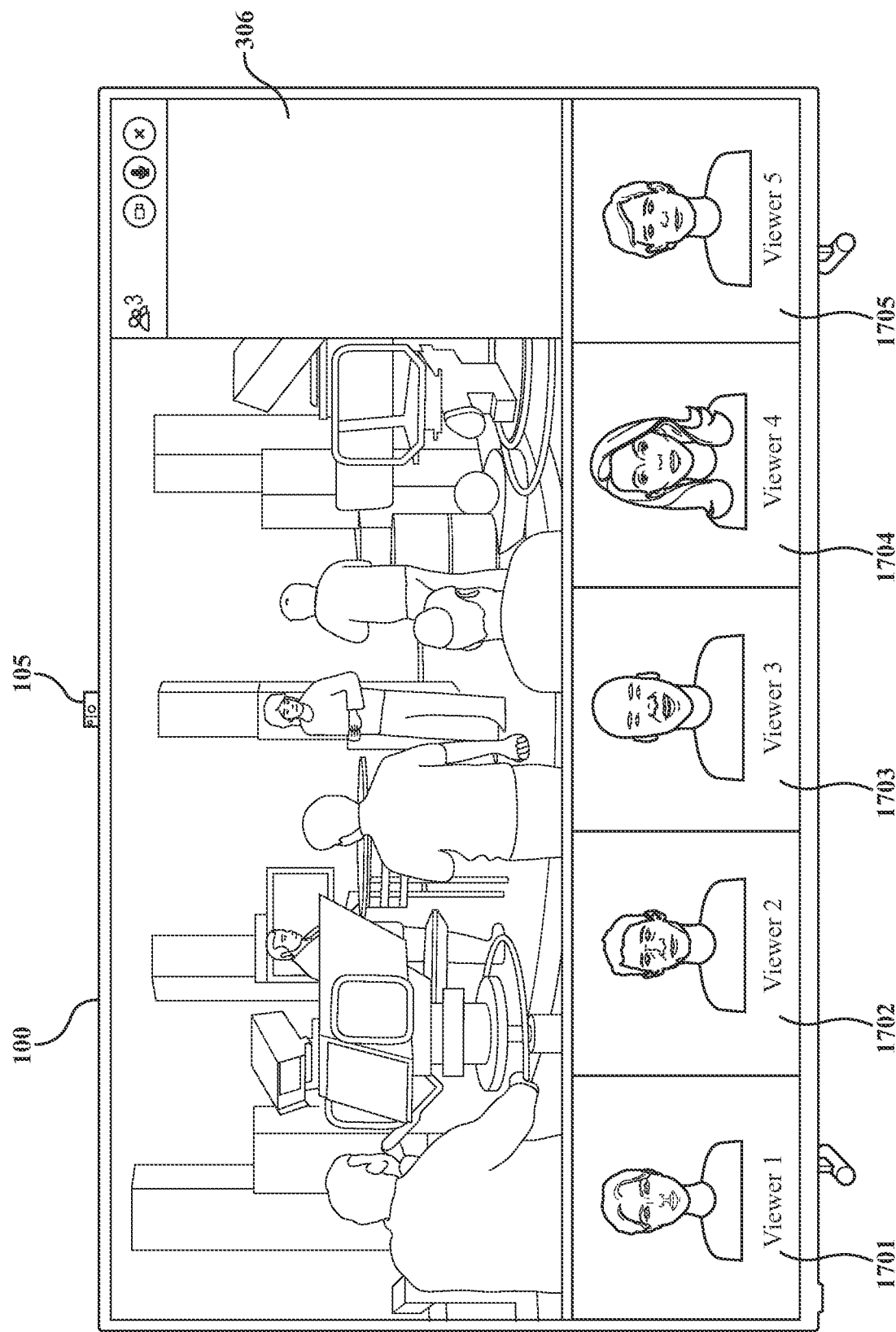
FIG. 19 shows the display of the television of FIG. 1 in a video watch party configuration in which a watch party interface is displayed.

FIG. 19 provides an example of a video watch party screen generated by video watch party app 1622. In FIG. 19 the viewers of the watch party are all presented with the same content in a content region of their displays, and icons or images representative of the watch party members Viewer 1, Viewer 2, Viewer 3, Viewer 4, and Viewer 5 are provided at the bottom of display and occupy respective "picture-in-picture" windows 1701-1705. A chat window 306 is provided adjacent the content region to display text messages between watch party members or display system messages.

FIG. 20A is a video watch party screen displayed on TV display 102. The program content is displayed in content region 1300 which occupies an upper left-hand portion of the display. Chat window 1706 is used for text messaging between watch party members and displaying system messages, for example, "TNT: NBA Denver Nuggets Lakers" as shown. Watch party members Viewer 1, Viewer 2, Viewer 3, Viewer 4, and Viewer 5 are represented by images, graphic objects, or real time video feeds in picture-in-picture windows 1701-1705. Telemoji menu 2100, described previously, may also be selectively displayed in the chat window based on a command received from the viewer. As mentioned previously, in FIG. 20A a target telemoji has been selected by the viewer and positioned over the referee to indicate that another telemoji, such as the Gatorade bucket, will traverse a path that collides with or otherwise engages the referee.

FIG. 20B shows a watch party program (i.e., the common program) and watch party screen of FIG. 20A, with the Gatorade bucket emoji dumping Gatorade on the targeted referee. Viewer 4 has executed a gesture corresponding to a thrown Gatorade bucket telemoji 2001 that traverses a looping path from the right-hand side of the content region 1300 and has engaged the referee shown in content region 1300. At or near a point of collision between the Gatorade bucket telemoji and the referee, the bucket dumps Gatorade onto the referee in response to Viewer 4's apparent disapproval of a certain penalty call, for example. Other techniques for targeting someone in the displayed program may also be used. For example, the telemoji display action may be preconfigured to target an official based on the gesture the viewer uses, or the user may be provided with an on-screen question asking whom to target. Additionally, as mentioned above, a gaze tracking process may be implemented to use the area of the viewer's focus to identify the target.

Figure 21:
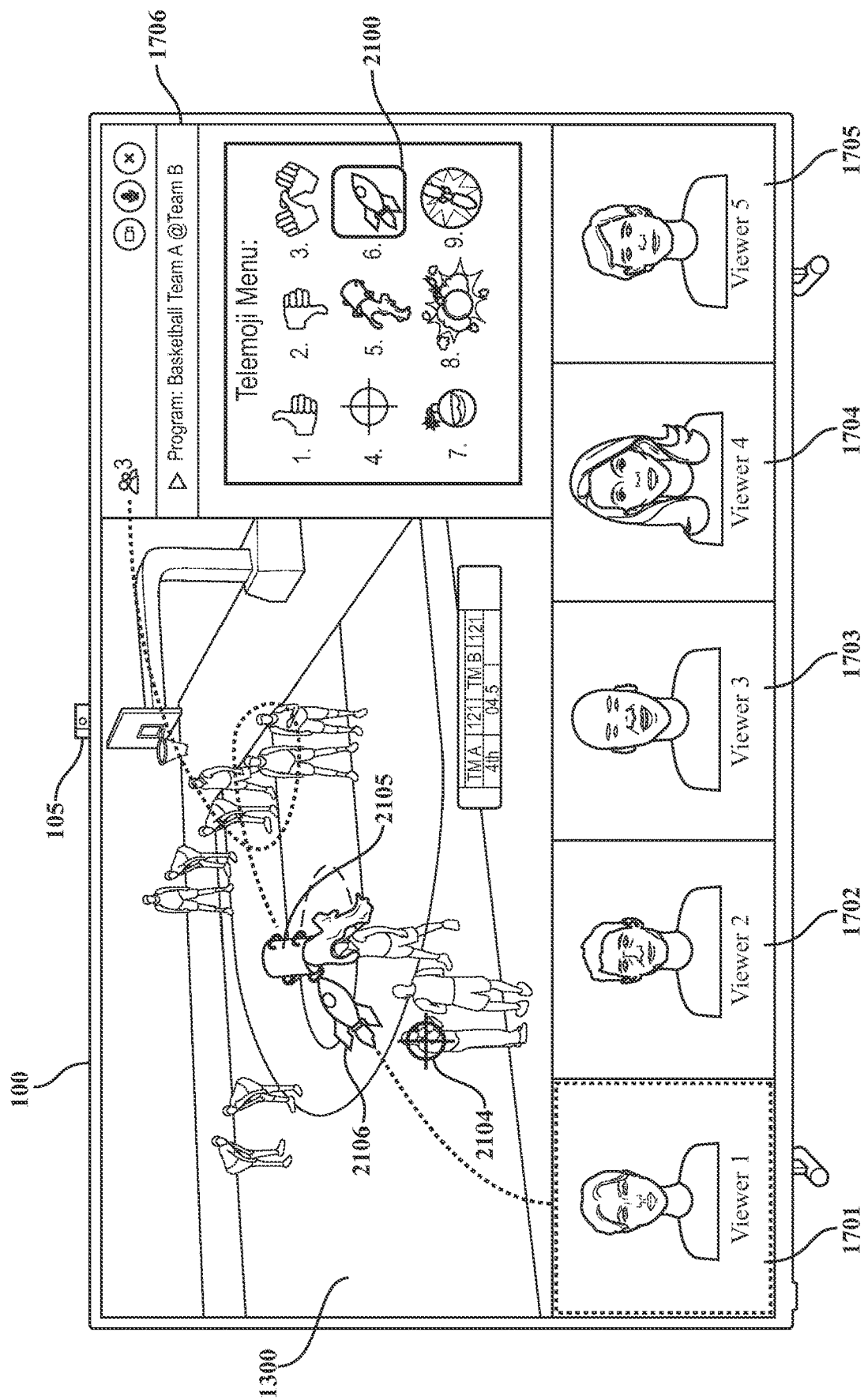
FIG. 21 is an example frame of the video watch party of FIG. 20A in which one member has launched a "countermeasure" telemoji to deflect the telemoji of FIG. 20 by executing a hand gesture corresponding to the counter measure.

In certain examples, multiple viewers may launch telemojis that engage one another. In FIG. 21 a watch party member other than Viewer 4 has executed a "countermeasure" gesture to cause another telemoji 2101 to collide with telemoji 2001 and prevent telemoji 2101 from colliding with the referee and dumping Gatorade on him.

Figure 22:
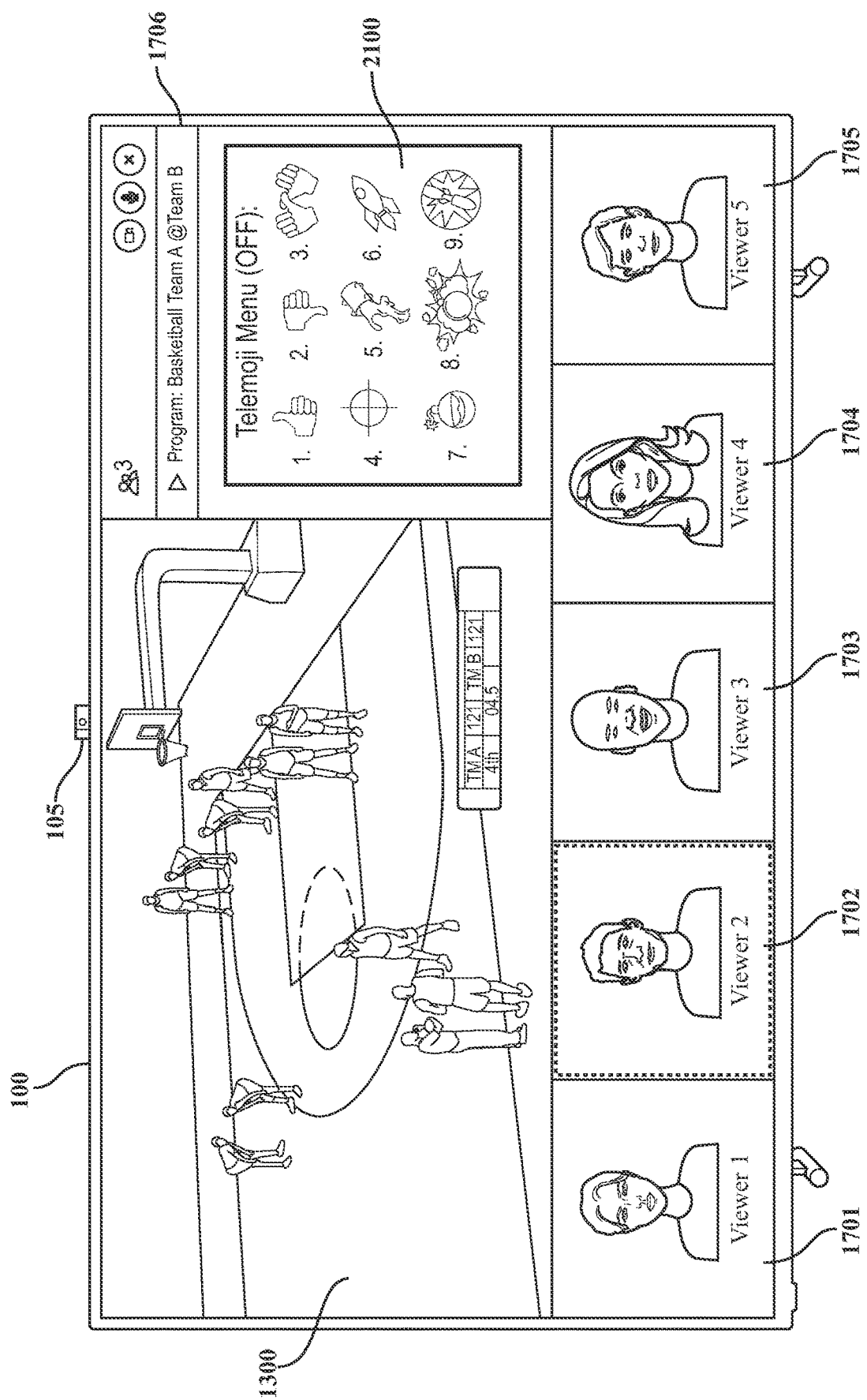
FIG. 22 is an example frame of the video watch party of FIG. 20A in which the viewer has blocked telemojis' originating from another watch party member.

In some cases, a watch party member may not want to see the telemojis of other members displayed on his or her television. FIG. 22 is the same watch party as in FIG. 20 but watch party member Viewer 2 does not wish to see the telemojis from viewer4 and has issued a verbal (aural) command to the TV of FIG. 1 not to display any telemojis applied by Viewer 2. In certain examples, any watch party member can block the display of any other member's telemojis on his or her screen.

Figure 13:
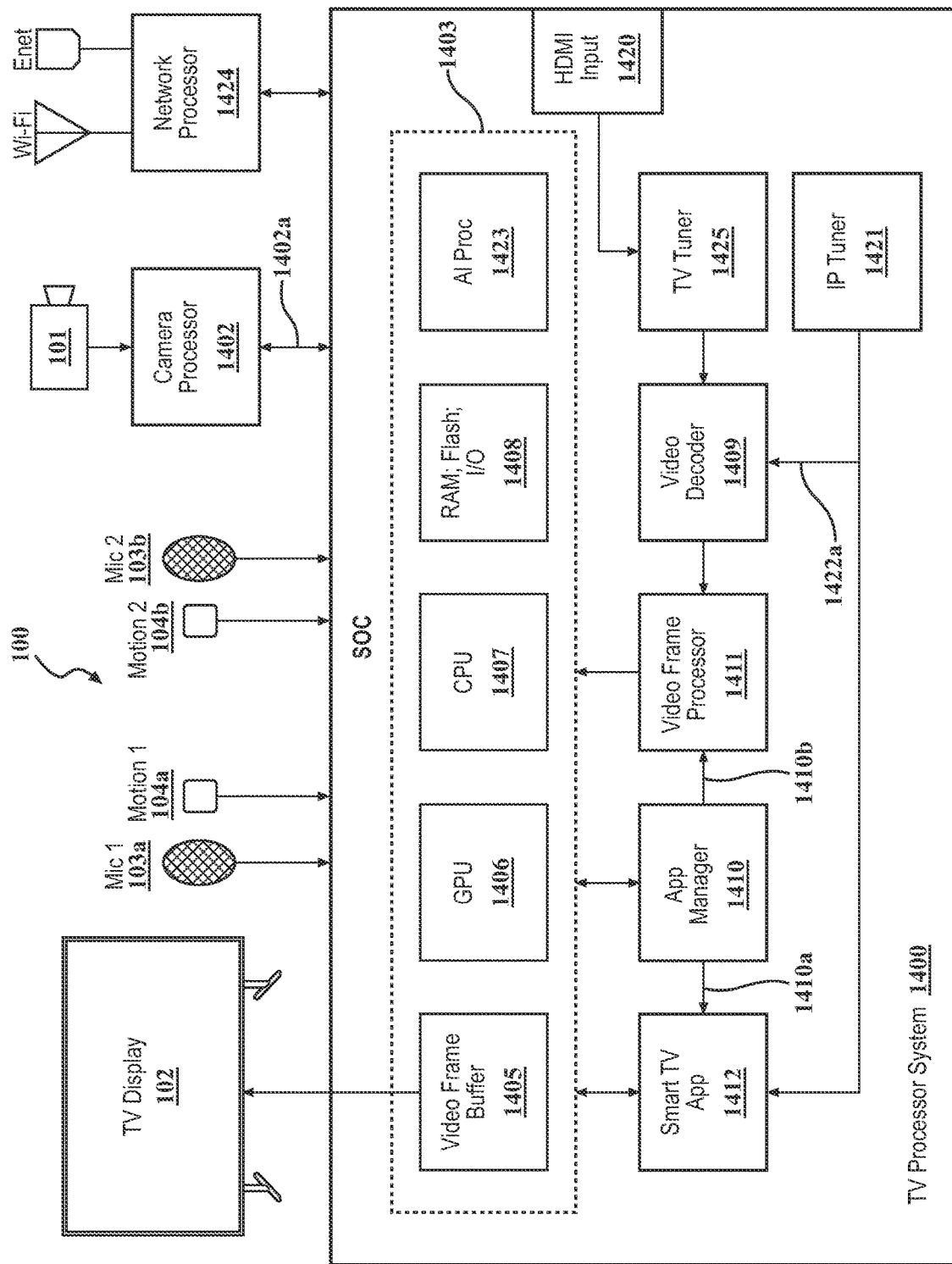
FIG. 13 is a block diagram of the processing system of the smart television system of FIG. 1.

The processing system supporting the functionality of the smart TV system as disclosed herein, is summarized in FIG. 13. The TV processor system 1400 is shown in a block diagram in FIG. 13 wherein television signals are received either from a set-top box via HDMI input 1420 or by a TV Tuner 1425 or Internet Protocol video is received by an IP Tuner 1421 via network processor 1424, which is connected to a LAN via Wi-Fi or Ethernet. Additional information regarding the environment directly in front of the TV display 102 is collected by one or more video camera systems 101 integrated into or otherwise operatively connected to TV display 102. As indicated in FIG. 13, the system of the TV processor system 1400 includes modules for providing the necessary functions of image reception, image manipulation (scaling, stitching, transforms, etc.), and software application (app) execution. The embodiment depicted in FIG. 13 is representative of a smart TV system. It is provided for example only and is not intended to restrict the disclosure to this diagram.

The one or more video cameras 101 in combination with the camera processor 1402 operatively connected to the smart TV system 100, provide digital picture information to the TV processor system 1400. TV processor system 1400 includes a system-on-a-chip (SOC) 1403 consisting of a CPU 1407, a graphical processing unit (GPU) 1406, RAM 1408, permanent storage (e.g.—flash memory) 1408, a video frame buffer 1405, a specialized AI processor 1423 and other necessary elements (i.e., video decoder 1409 and video frame processor 1411), for use in a processor system of a smart TV. The camera information 1402a (video stream) of the disclosure may be processed by the video frame processor 1411 under the control of app manager 1410 running in the memory of the SOC 1403 which processes the incoming camera video stream to act on the video information under the control of the application running in smart TV app 1412.

The smart TV app 1412 represents a plurality of apps each of which may also be executing a video calling or conferencing application or executing an entertainment application such as video watch party app 1622 or otherwise processing video both incoming from the other end or ends of a video conference call. TV smart app 1412 may also provide the network streaming to send the processed video of the camera processor 1402 through the Internet to the other parties of a multi-way video application. Video watch party app 1622 (FIG. 15) is an example of a smart TV app 1412. The app manager 1410 may assist any smart TV app 1412 in processing the video broadcasts received by the TV tuner 1425 or the HDMI input 1420 received from a set-top box, or video received over the Internet by IP network interface 1422.

In all examples, the app manager 1410 does, among other things, the processing of the composite video output of any smart TV app 1412 that is currently active in memory so that the composite video picture involving local and remote video sources and whatever other elements such as graphic overlays generated by TV apps are scaled and positioned appropriate to the executing application or service.

The system of the disclosure identifies and tracks actions of users in front of the TV in real-time and in the background, without the need for a user to request the service or even be aware of its presence. However, the identification system may be disabled for any or all persons of the household.

In one embodiment, the system of FIG. 14 utilizes three inputs of audio, video, and motion data. In certain examples in which a group of viewers is smart TV system 100, the microphones 103a and 103b can be utilized as a beamforming pair to allow the processes associated with the automated viewer processor module 1506 to direct the audio lobe (focus) in the area in front of the television in order to enhance the audio from one person and reject the audio from other people proximate to the person of interest. In certain examples, an artificial intelligence subsystem determines the most probable person upon whom to focus the microphones 103a and 103b by utilizing the viewer visual identification & gesture recognition module 1507 to visually detect the lip motions of a group to persons in range of the camera system 101 and synchronize the lip motions with audio data received from microphones 103a and 103b to determine which viewer in the presence of the TV is most likely speaking (or emitting some other voice gesture.)

The speech recognition of the system occurs via the viewer aural identification module 1505 which then provides viewer identification information to the automated viewer processor module 1506 so that the aural gesture received from microphones 103a and 103b is associated with the identified speaker. Additional viewer identification occurs via viewer visual identification and gesture recognition module 1507 which applies facial recognition technology, as described previously and well known to the skilled person. In order to best identify one or more viewers in the vicinity of the television system, an automated viewer processor module 1506 may direct the video steering logic 1501 to isolate a viewer from a group of viewers by employing AI video analysis 1502 in combination with video steering logic 1501 to digitally zoom into and isolate a particular face out of a plurality of faces or from a complex background.

Figure 15:
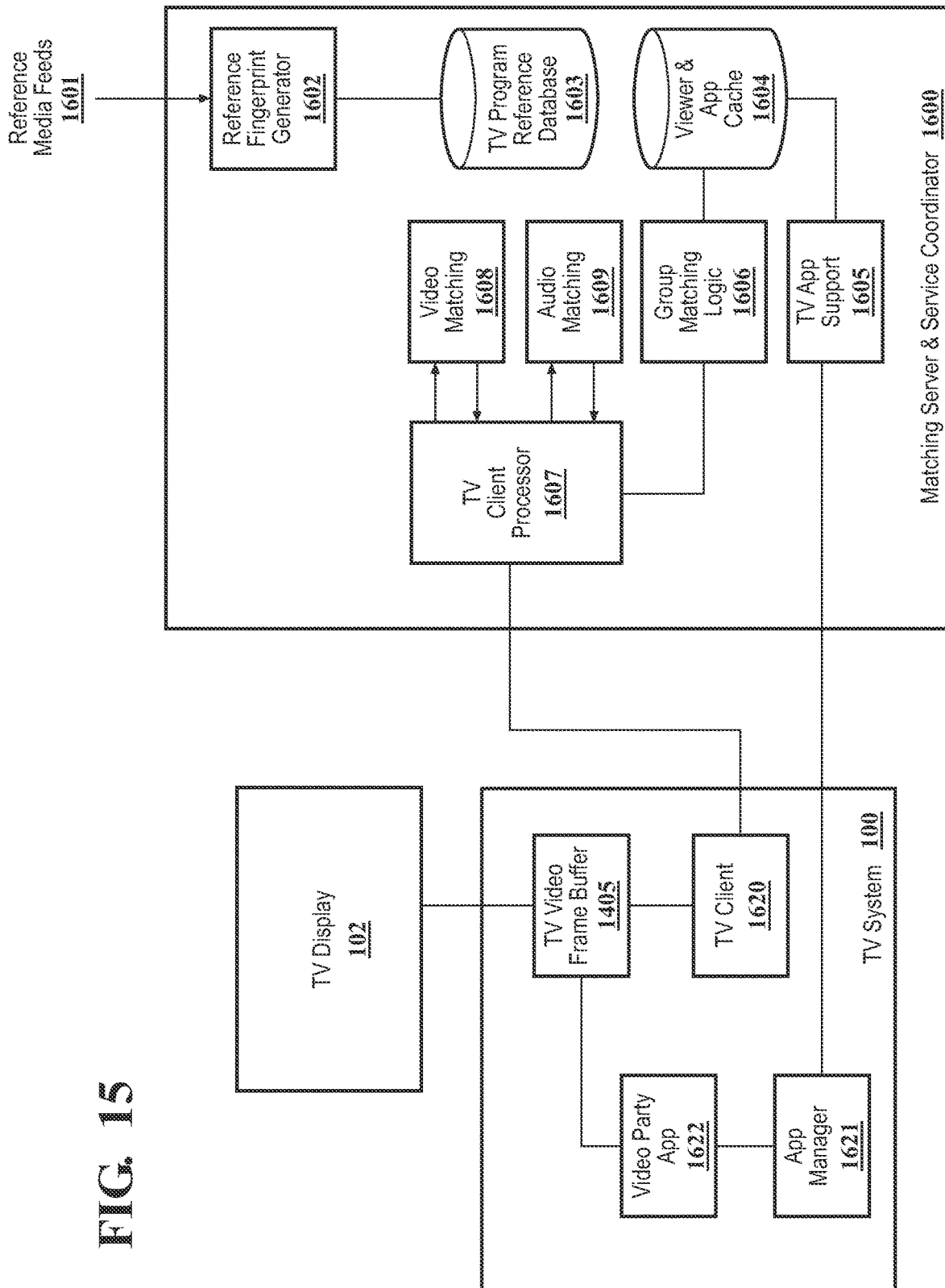
FIG. 15 is a block diagram of a system for detecting a plurality of viewers who are watching the same television programming.
Figure 16A:
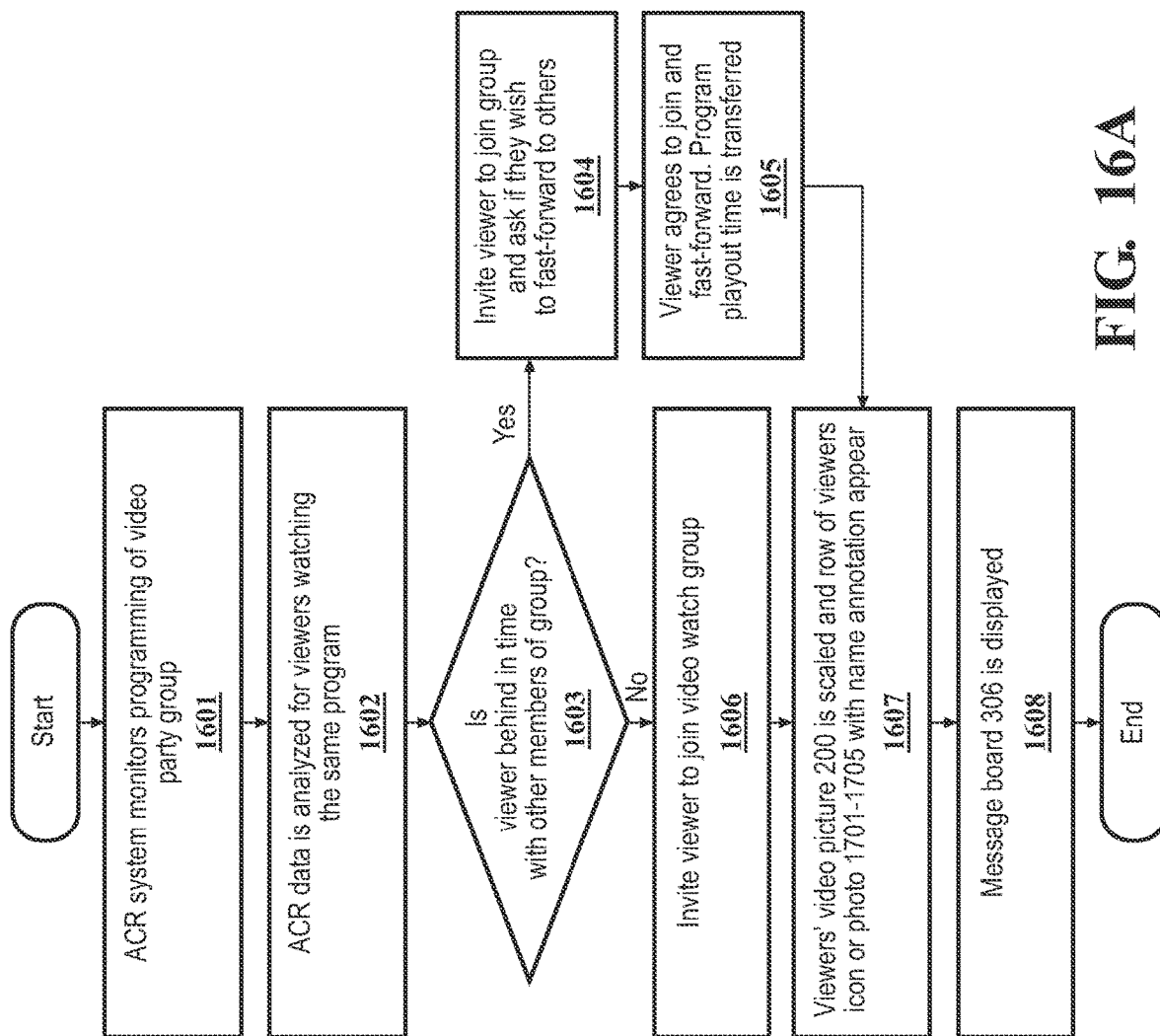
FIG. 16A depicts a method of identifying potential watch party viewers by means of an automatic content recognition (ACR) system.
Figure 16B:
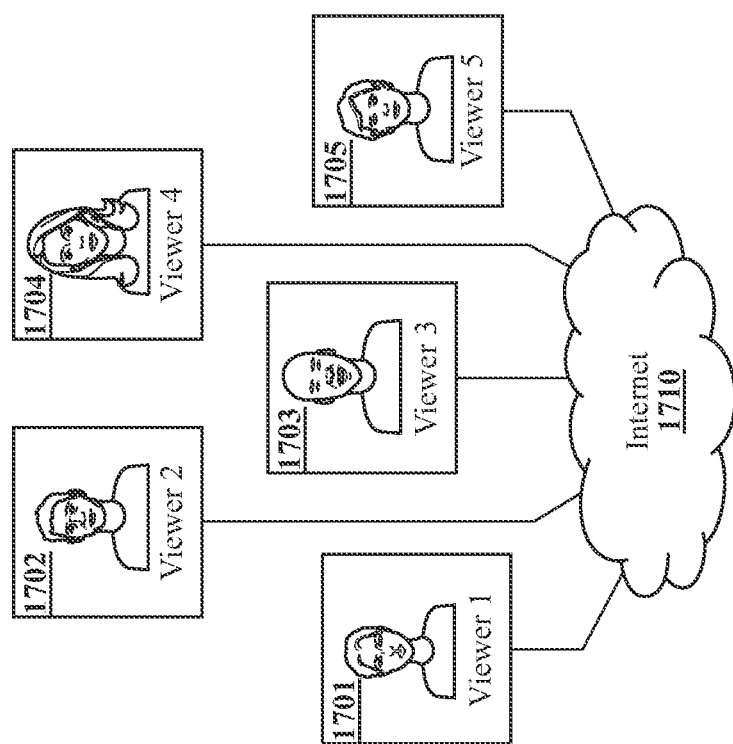
FIG. 16B is a system diagram of a peer-to-peer mesh network comprising members of a watch party who are concurrently viewing the same television programming.

Systems and methods for creating a watch party and synchronizing the common program being viewed by watch party members will now be described with reference to FIG. 15. In accordance with the example, a viewer will have pre-associated with other potential watch party members as "friends" in a manner similar to social media networks such as Facebook. The friends list serves as a potential watch party list. The process of configuring a watch party may be carried out in several ways. Viewers will have the opportunity to subscribe to the watch party service. In one embodiment, a remote server will at regular intervals automatically scan the programs being displayed on the smart TVs being viewed by the people on each subscriber's friend's list, and if two or more friends are watching the same content (also referred to as a "common program" herein), the remote server will automatically send watch party invitations to those two or more friends. Those who accept the invitations will then define the watch party. Because they are already viewing the same video content, once they accept the invitations their respective video watch party apps 1622 will display on their respective TV displays 102 a watch party interface (examples of which are shown in FIGS. 19-21), which simultaneously displays the watch party content and communications between watch party members. The watch party members can then communicate via text, telemojis, or audio if they have enabled microphones on their TV displays or remotes. In each of the three techniques for initiating a watch party, telemojis may be triggered for display onto the displays of all watch party members in accordance with the methods described previously (e.g., menu selection, gesture recognition, channel change data, and/or genre data).

In another embodiment, a person watching a program in real-time may send a request to the remote server to form a watch party. The remote server will then scan the content being displayed on the smart TVs associated with each friends list member and send invitations to join a watch party to those viewing the same content. Those who accept those invitations will define the watch party.

In a further embodiment, a person may seek to form a watch party to watch content that is scheduled for display at a later date or time. The person will send a request to the remote server, and in this case, the remote server will send invitations to all of those who wish to join the watch party. Those who accept the invitations will define the watch party and will be considered "watch party members." However, if they are not viewing the content that is the subject of the watch party at the time it is being aired (or viewed by the requester), they will be sent a reminder to change the channel or otherwise switch programs to the watch party content. Each of the foregoing embodiments may also be modified to send an invitation to select friends who are not viewing the watch party content at the time it is being displayed.

In each of the foregoing implementations smart TV system 100 will only display a watch party interface (such as those depicted in FIGS. 19-21) with a representation of watch party members on the display 102 if the viewer of that display has both accepted an invitation transmitted by TV client processor 1607 to joint a watch party and is currently viewing the watch party program. In the case of an embodiment where group matching logic module 1606 automatically periodically scans the content of a viewer's friends list, the invitation will be triggered by matching server and service coordinator module 1600 having determined that two or more members of the friends list are viewing the same content. Therefore, once the invitation is accepted, managing server and service coordinator 1606 will assign a network address (e.g., an IP address where the network is the Internet) to each viewer, and each viewer accepting the invite will be joined in a peer-to-peer network with other invitees who accepted. TV client processor 1607 will transmit an instruction to that viewer's watch party app 1622 to display the interface with the representations of the watch party members in the various picture-in-picture windows 1701-1705 on the viewer's TV display 102. Thus, the TV client processor 1607 is operatively connected to the TV displays of each watch party member in the sense that it can issue instructions dictating the form and content of what is displayed on those displays.

In certain cases where a viewer transmits a request to TV client processor 1607 to form a watch party, invitations will be sent to whichever friends list invitees the viewer selects, regardless of what the invitees are watching. In other words, the viewing of a common program is not a prerequisite to receiving an invitation to join the watch party. Once an invitee accepts, his or her television will be added to a peer-to-peer network with other accepting invitees. However, the watch party interface (e.g., the interface of FIGS. 19-20) will only be displayed on the accepting invitees' respective TV displays if and when they are viewing the common program while the watch party is in progress. The process of viewing that content may be automated, for example, by displaying a "Join" button on the accepting invitees' smart TV display which he or she can then select to cause his or her smart TV processor system 1400 to display the watch party interface and the common program within the content region thereof (e.g., region 1300 in FIGS. 20A, 20B and 21).

As indicated above, in each of the watch party configuration scenarios, a step in the process of operating a watch party is determining whether two or more members of a viewer's friends list are currently viewing the same program (e.g., a "common program"). To do this, video and/or audio "fingerprint" data extracted from a program currently being viewed by the two or more members of the friends list is compared to reference data extracted from known programs. A matching server and service coordinator module 1600 is provided and includes a group matching logic module 1606 which tracks the activities of a viewer's friends list members and sends invitations to them to initiate the formation of a watch party. The ACR module 1510 associated with watch party equipped TVs can automatically detect, via the remote matching server & service coordinator 1600 and its group matching logic module 1606, the members of a viewer's friends list who are currently watching the same program even if not at the same time position within the program. In the case of an embodiment in which the matching server and service coordinator module 1600 automatically and periodically scans the content of viewer friends list members to form a watch party, when the system detects that at least two members of a viewer's friends list are viewing the same content, it sends invitations to those at least two members to form and join a watch party. If at least two invitees accept the invitation, a watch party is formed, and a peer-to-peer network comprising the televisions of those invitees is formed. Group matching logic module 1606 will also detect friends list members watching the same TV program series of any episode as well as to detect members watching the same genre of programming (example: specific sports such as football, baseball, hockey); situation comedy; standup comedy; mystery, cooking show, etc. In certain embodiments, when friends list members are viewing such related, but not identical, content, they will be provided with screen that allows them to send text messages to one another to coordinate a possible watch party, and friends who are reviewing related content and who have microphones on their TVs or remotes will be able to speak directly to one another.

In an embodiment where a viewer requests the formation of a watch party for content he or she selects in advance of viewing it, he or she may select members of his or her friend's list to whom invitations will be sent by matching server and service coordinator 1600. Those who accept the invitation will define the watch party, will be associated with one another via a peer-to-peer network, and will be identified on a watch party list managed b watch party list module 2303. However, at the scheduled time for the watch party, if group matching logic module 1606 determines that any particular member of the peer-to-peer network is not watching the watch party content, he or she will not appear on the watch party display (e.g., FIGS. 19-21) of the other watch party members unless and until he is viewing the watch party content, and if necessary, agrees to synchronize the playback of the watch party content to the playback time of the other watch party members (as discussed further below). In the case of watch party members who are not watching the watch party content ant have not joined the watch party, other watch party members may send them on-screen text messages encouraging them to join. Thus, the non-joining members will be provided with a display that has a text message region or which allows text messages to be overlaid on the content they are currently viewing.

When members have joined in watching the same programming, when feasible the disclosed system will synchronize the content playback point in time. The watch party members may directly comment to each other with the comments overlaid on the common program, or they may comment via social media with their comments being shown on screen in a separate window. In the examples of FIGS. 19-21, the watch party members' comments may appear in text window 306 or 1706 or as comment bubbles in the content region 1300.

In certain examples, the group matching logic module 1606 will receive a current playback time of the commonly viewed program from each watch party member, and if a member agrees, the matching server and service coordinator 1600 will advance the playback times of all members to the highest (furthest along) playback time of all other watch party members. Preferably, the members images will only appear on a watch party screen of the type shown in FIGS. 19-21 for those watch party members whose playback times for the watch party content are synchronized.

Figure 23:
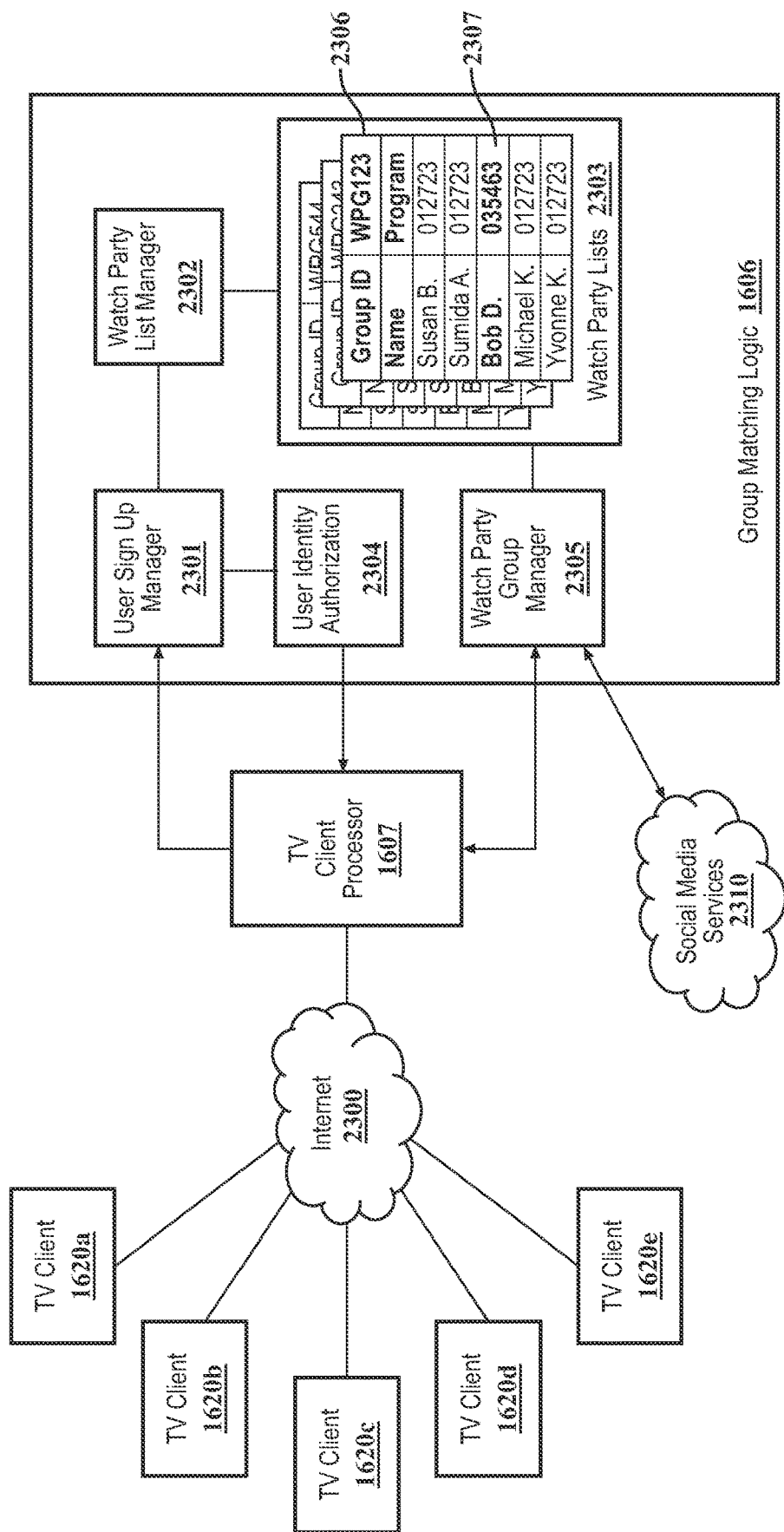
FIG. 23 is a block diagram of a watch party management system showing client TVs in communications with the server system to facilitate the process of associating users watching the same TV program and initiating the service thereof.

The system used to create and otherwise enable a watch party is illustrated in FIG. 23. Each TV client 1620a-e subscribed to the watch party service is in communication with the other TV clients 1620a-e via a public network 2300, such as the Internet, and with server system matching server & service coordinator 1600 (FIG. 15) mentioned above. The communications from a TV client 1620a-e are received by TV client processor module 1607. In the embodiment in which a viewer wishes to form watch party for content he or she is currently viewing, the viewer wishing to form or join a video watch party interacts with an on-screen menu on an enabled smart TV via the TV's processor system 1400. The smart TV app 1412 (which in this case is the video watch party app 1622 of FIG. 15), sends a request to TV client processor module 1607 to initiate a search for other members of that person's friend's list that may be viewing the same TV program such as a sports event.

The process of discovering other members of a watch party group watching the same TV program is achieved using automated content recognition (ACR). In order to utilize ACR, the ACR module 1510 (FIG. 14) must be temporarily reconfigured to add the user's identity to the incoming ACR fingerprints received by matching server and service coordinator 1600 from that person's enabled smart TV, otherwise the fingerprint data collected by an ACR system is anonymous by default. The "fingerprints" may include metadata describing the program or image or audio data that can be compared and matched to reference data. Such image data may include, for example, frames of video data or subsets of pixels data extracted form pixel data. Techniques for generating content "fingerprints" using image data or audio data to identify a program are shown and described in U.S. Pat. No. 8,595,781, the entirety of which is hereby incorporated by reference.

The process of tagging the incoming fingerprints with user identity data is supported by the user sign-up manager 2301 in communication with the respective user's video watch party app 1622. When a user signs up for or initiates a watch party request, the sign-up manager 2301 enables the user identity authorization 2304 process to add user identity metadata to the incoming fingerprint from the respective watch party TV. Once configured, the ACR fingerprints received from the respective TV clients by TV client processor module 1607 are provided to the video matching logic module 1608 and/or the audio matching logic module 1609 to identify the program content. Video matching logic module 1608 and/or audio matching logic module 1609 compare the received fingerprints with corresponding forms of reference data stored in TV program reference database 1603. In certain examples, the TV program reference database 1603 comprises data records that include a program identifier field and one or more video data and/or audio data fields comprising video or audio data that has been extracted from the program identified in the program identifier field. In certain examples, the video data will comprise video frame data (i.e., the image data for a single frame of video) for one or more frames of video. In other examples, the video data may include the pixel (intensity) data for pixels at specific x, y, locations in one or more video frames.

The data in TV program reference database 1603 is provided by reference fingerprint generator 1602 based on reference media feeds 1601. The identity of the TV program as identified by the matching service and server coordinator 600 is then routed through the TV client processor module 1607 which conveys the information to the group matching logic module 1606. A watch party list module 2303 receives real-time program identity data for each member of each watch party group (i.e., those viewers who have accepted an invitation to join a watch party) and maintains a table of program identifiers 2306 for a watch party group. For example only, the watch party group WPG123, shown in FIG. 23, reveals that four of the five watch party group members are tuned to the same TV program, identified as 012723 and that member 2307 is not turned to that program.

This information is conveyed by the watch party supervisor (network manager) 2305 to each member of the watch party and allows those members who are watching the same program to join the watch party by means of an invitation appearing in a pop-up window on their respective smart TVs alerting them to the opportunity. In one instance of the disclosure, in the case of member 2307 not watching the same program as the other members, a pop-up window might appear on that person's smart TV to let him know that the others are joined in a watch party for program 012723 and he is invited to join. It should be obvious to the skilled person that the program identifier such as '012723' is translated by the software of the system to an actual program name and channel number, such as 'NBA playoffs on Channel 7', for one example.

Figure 17A:
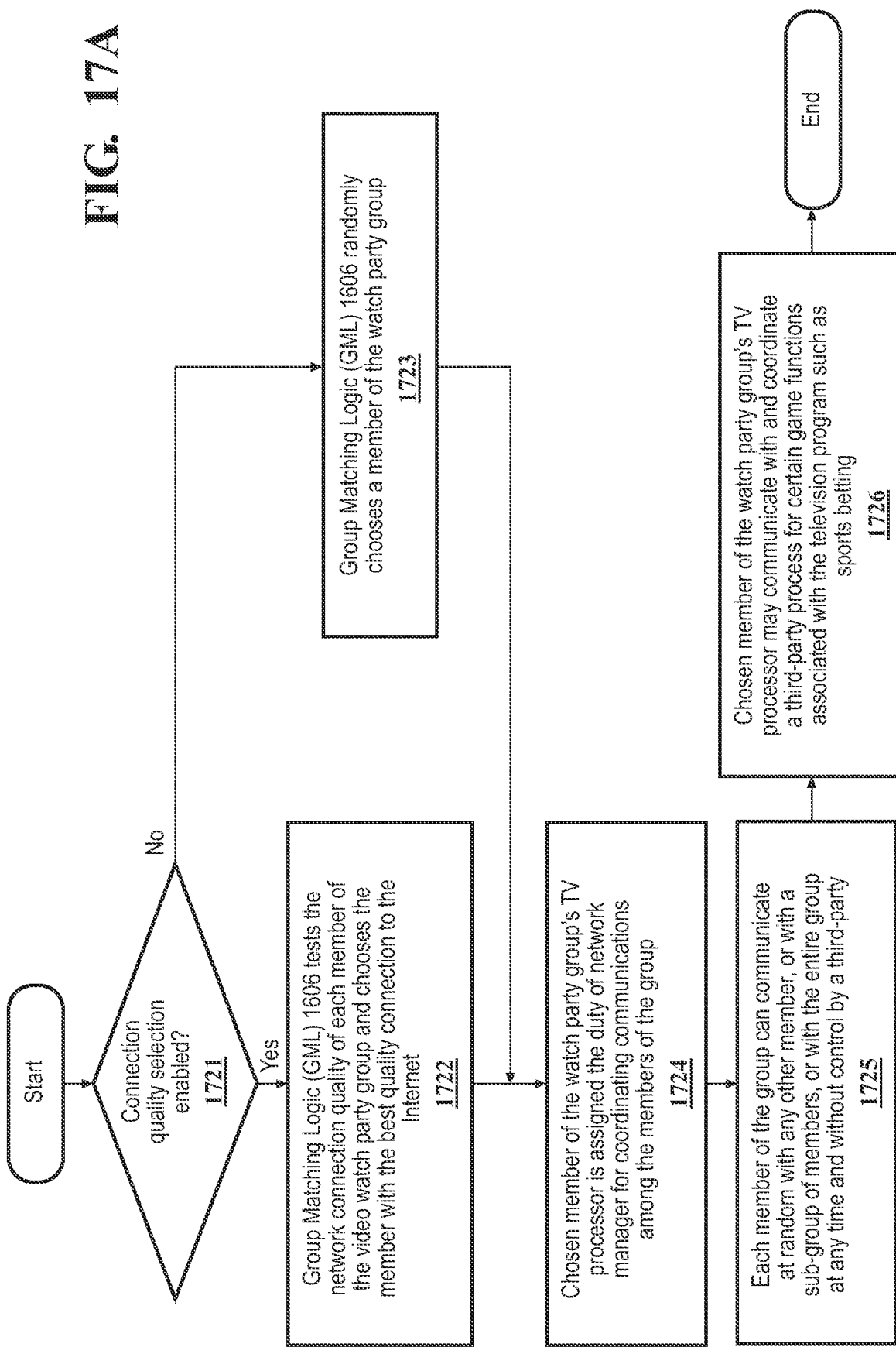
FIG. 17A depicts a method of selecting a video watch party network manager to facilitate peer-to-peer sharing of voice, text, video, and certain programmatic elements with video watch party members.
Figure 17B:
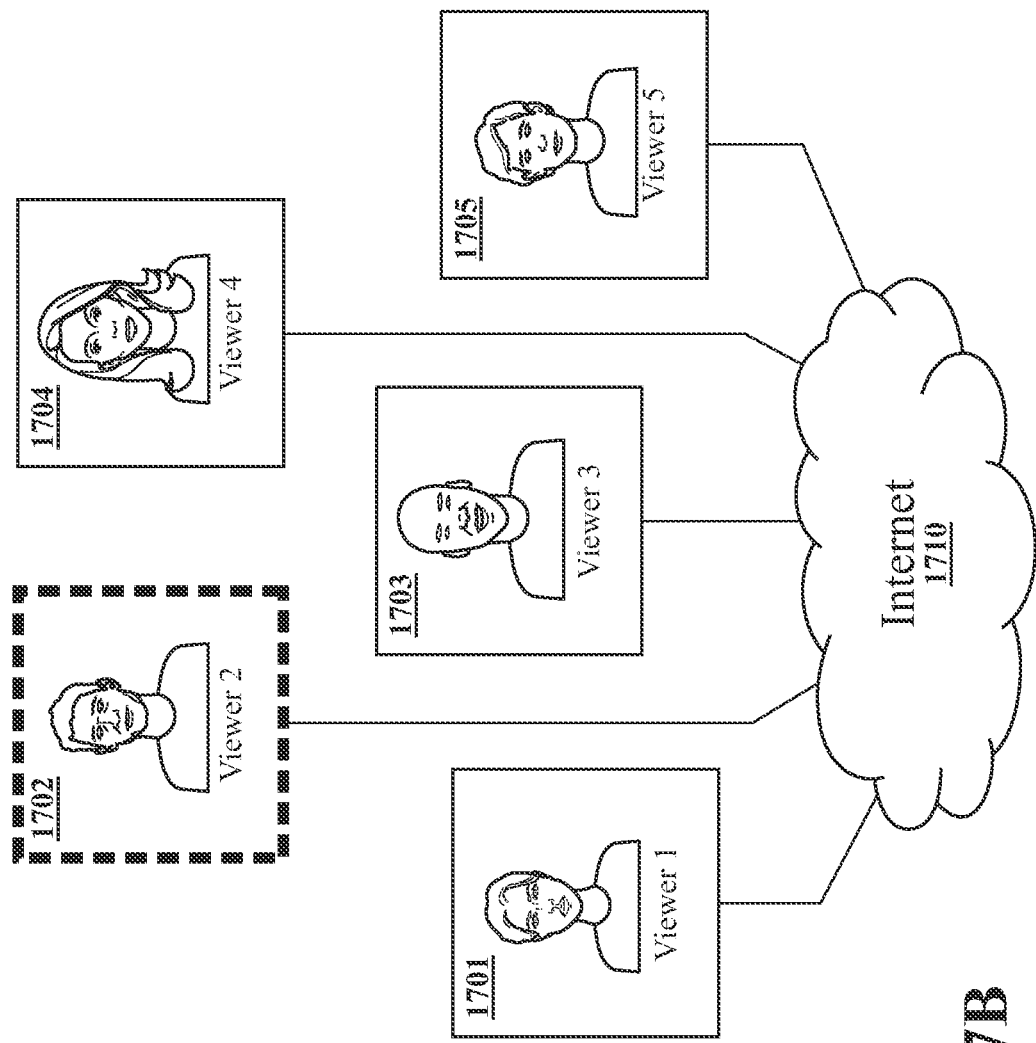
FIG. 17B is a system diagram of a video watch party comprising members who are concurrently viewing the same television programming via a peer-to-peer mesh network in which a watch party member is highlighted to indicate his selection as network manager.
Figure 18:
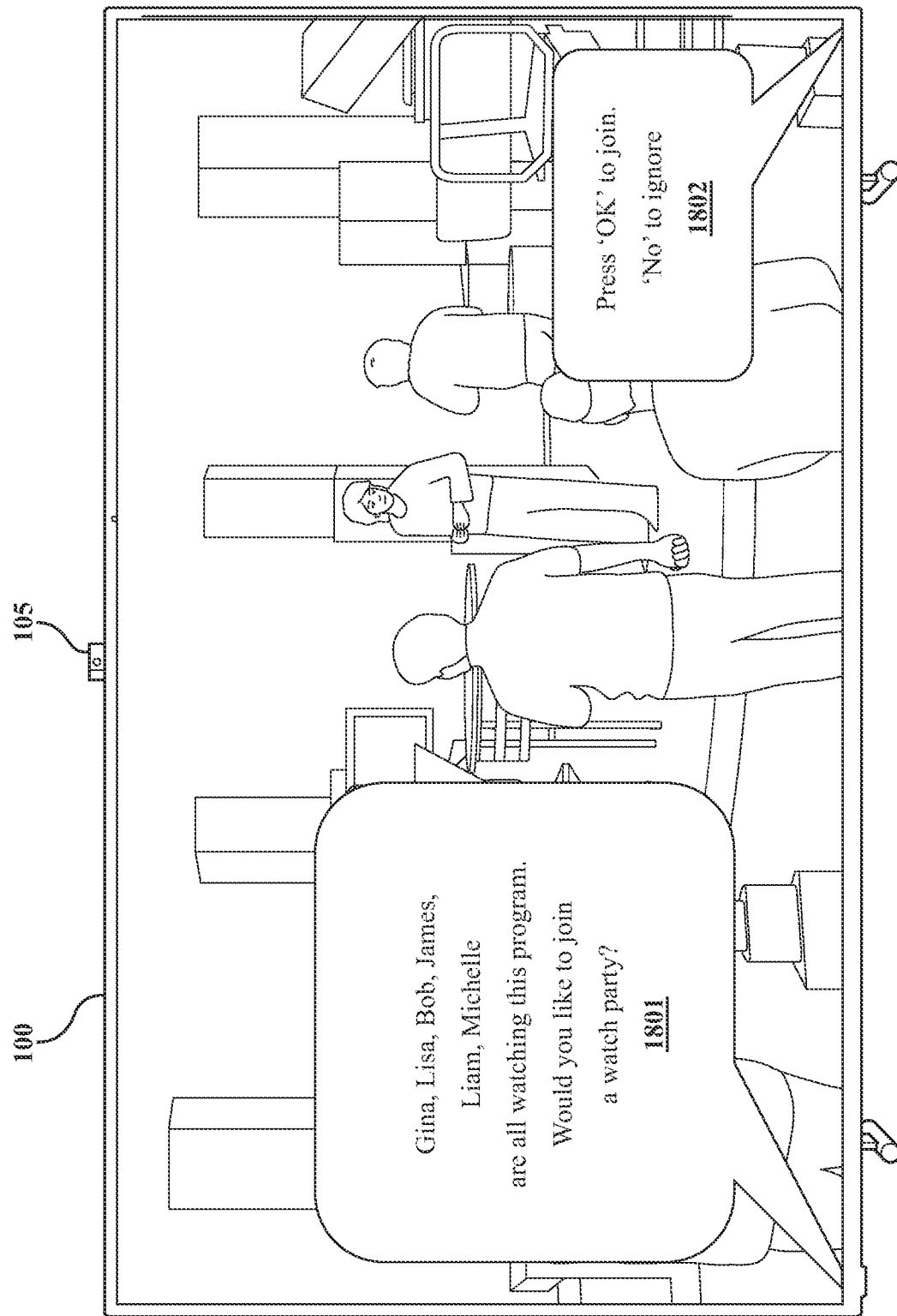
FIG. 18 depicts the television of FIG. 1 displaying an invitation to a viewer to join a watch party with other viewers viewing the same content.
Figure 24:
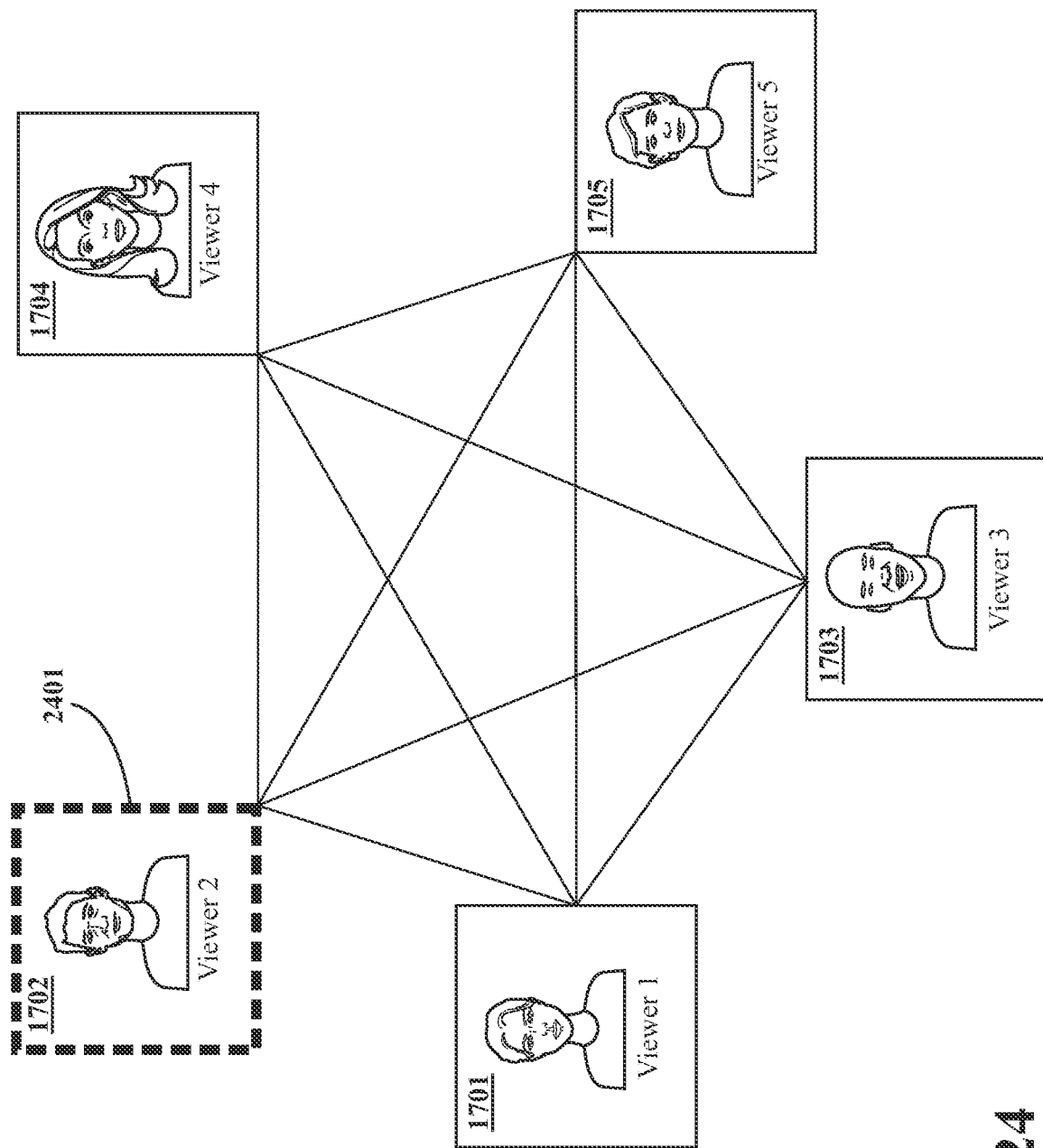
FIG. 24 is a network diagram of a group of users engaged in a video watch party wherein each user can directly communicate with each of the other members of the watch party group and wherein a single member of the group is designated to supervise the group.

In preferred examples, once two or more members of a watch party group list accept an invitation to join a watch party (even if they have not yet joined the watch party either because it has not begun or because they are viewing other content), their televisions are dynamically configured as a peer-to-peer network. In a peer-to-peer network, one member of a group on a network node can direct a graphic element to be superimposed upon the viewer's tv display and simultaneously seen by other members of the group. The communication between the members of the watch party group is known to the skilled person as peer-to-peer as illustrated in FIG. 24. To initiate the peer-to-peer network communications, the central watch party group manager module 2305 (FIG. 23) will designate one of the watch party members as the supervisor member (also known as the "network manager") 2401 and all the members of the watch party group will each be a client of the group with equal status for communication with one another. FIG. 17B also illustrates a peer-to-peer network of Viewer 1, Viewer 2, Viewer 3, Viewer 4, and Viewer 5 with Viewer 2 having been selected as the supervisor (network manager).

The choice of supervisor could be simply random, or it could be by means of measurement of bandwidth available to each member. For example, one member might have significantly better Internet service that the others. Should the supervisor member leave the group, the watch party group manager module 2305 will assign a new supervisor in the same manner. Referring to FIG. 17A, a method of selecting a network manager is illustrated. In step 1721 a determination is made as to whether connection quality selection is enabled. "Connection quality selection" refers to the use of the peer-to-peer network connection quality of the watch party members' televisions as a basis for selecting a network manager (supervisor). If connection quality selection has not been enabled, control transfers to step 1723 and group matching logic module 1606 randomly selects a watch party member as the supervisor (network manager). If connection quality selection has been enabled, control transfers to step 1722, and the member with the best connection quality is assigned the duty of network manager. Methods for determining the quality or strength of a connection to the peer-to-peer network are well known to those skilled in the art. In the case of an Internet-connected peer-to-peer network, the quality of each watch party member's connection to the Internet may be used to select a network manager.

In step 1724 the chosen supervisor is assigned the duty of network manager for coordinating communications among watch party members. In step 1725 communications from the watch party to TV client processor module 1607 are all made by the supervisor. Any other TV needing to communicate with TV client processor module 1607 will send its communications to the supervisor (network manager) for transmission to TV client processor module 1607. Also, in step 1725 subgroups of watch party members can communicate with one another. The supervisor (network manager) may also communicate with any third-party processes on behalf of the watch party in step 1726. One example might be communicating with a remote betting service during a sporting event watch party.

In some embodiments, the watch party group can utilize a microphone built into the remote control to speak to the group while the group is peer-to-peer connected as a watch party. The audio of the voice comments of the group is then mixed with the television program being viewed and played through each other members' smart TV speakers. Each member of the group can adjust the audio level of the watch party group that is mixed in with the television program of that member's TV. Any member of the watch party group can mute their own microphone as well as block audio of any or all of the other members of the group.

Social media may also be used to recruit watch party members. In the case of a social media recruiting system, the watch party group manager 2401 becomes a member of the respective social media services communicating independently via the Internet 2310. For example, a user wishing to form a new watch party group would first, for example only, navigate on a social media website, such as Facebook, to the Facebook page of the service, for example the 'Vizio Watch Party Valet.' The user would register the request for a new watch group and enter the names of prospective friends to join the group. The valet would then send out invitation to the members. As members respond yes or no, the watch party list also contains the identity of the valet service which provides the link to the central matching server & service coordinator 1600 thereby reducing the task of creating watch parties to something very familiar to most TV viewers today.

As explained previously, when potential watch party members accept an invitation to participate in the watch party, they are peer-to-peer networked to one another. The peer-to-peer communications occur between the processor systems of each respective watch party member. That is, each TV processor system 1400 is provided the network address (e.g., IP addresses in the case of a peer-to-peer network formed over the Internet) of the other members of the watch party group. The network processor 1424 utilizes the network addresses of the other members to establish a point-to-point communications link with each of the other members allowing audio and visual communications to be established without the need for the audio and video signals of each participant needing to be processed by a centralized server system. This inter-member communication is similar to the many services in common use today such as Zoom, Microsoft Teams, Google Meets, and many others.

What is claimed is:

1. A method of operating a video watch party, comprising:
identifying a current program being viewed by at least two members of a viewer's friends list to obtain one or more current programs being viewed by at least two members of the viewer's friends list, wherein the step of identifying a current program being viewed by the at least two members of the viewer's friends list comprises:
receiving video frame data from a respective one of the at least two members of the viewer's friends list, wherein the video frame data is extracted from the current program being viewed by respective one of the at least two members of the viewer's friends list, comparing the received video frame data to stored video frame data, wherein the stored video frame data is included in video data records that further include a program identifier of a program from which the stored video data was extracted, and
retrieving a program identifier from a video data record having stored video frame data that is a closest match to the received video frame data;
identifying members from among the at least two members of a viewer's friends list who are currently viewing a common program, wherein the common program is from among the one or more current programs;
transmitting an invitation to join a video watch party to respective smart televisions of the at least two members of a viewer's friends list, wherein the step of transmitting an invitation to join a video watch party to respective smart televisions of the at least two members of a viewer's friend's list comprises transmitting the invitation to the respective smart televisions of the members from among the at least two members of the viewer's friends list who are currently viewing the common program;
selecting a set of selected members who accepted the invitation from among the members who are currently viewing the common program; and
transmitting to respective smart televisions of each selected member an instruction to simultaneously display the common program together with a representation of all selected members.

2. The method of claim 1, wherein the representation of the selected member is one selected from an image of the selected member, a graphical representation of the selected member, and a real time video feed of the selected member.

3. The method of claim 1, wherein the instruction to simultaneously display the common program together with a representation of all selected members comprises an instruction to simultaneously display the common program together with a text message display region and a representation of all selected members.

4. The method of claim 1, further comprising:
adjusting a current playback time of the common program for one of the selected members based on a current playback time of the common program for another of the selected members.

5. The method of claim 1, wherein the step of selecting the set of selected members further comprises selecting those members agree to have a current playback time of the common program adjusted on their respective displays.

6. The method of claim 1, further comprising establishing a peer-to-peer network, wherein the peer-to-peer network comprises the respective smart televisions of the selected members.

7. The method of claim 6, further comprising:
identifying a network manager from among the selected members by receiving data indicating a quality of a connection to the peer-to-peer network for each respective smart television of the selected members; and
identifying a one of the respective smart televisions that has a connection quality greater than others of the respective smart televisions and selecting as the network manager the selected member corresponding to the one of the respective smart televisions.

8. The method of claim 6, further comprising randomly selecting a network manager from among the selected members.

9. The method of claim 6, wherein the step of establishing a peer-to-peer network comprises assigning an IP address to each respective smart television of the selected members.

10. A system for operating a watch party, comprising:
a computer processor unit operatively connected to a smart television display;
a non-transitory computer readable medium having computer executable instructions stored thereon which, when executed by the computer processor, perform the steps of claim 1.

11. A method of operating a video watch party, comprising:
identifying a current program being viewed by the at least two members of a viewer's friends list to obtain one or more current programs being viewed by the at least two members of the viewer's friends list, wherein the step of identifying a current program being viewed by the at least two members of the viewer's friends list, comprises:
receiving audio data from a respective one of the at least two members of the viewer's friends list, wherein the audio data is extracted from the current program being viewed by the respective one of the at least two members of the viewer's friends list,
comparing the received audio data to stored audio data, wherein the stored audio data is included in audio data records that further include a program identifier of a program from which the stored audio data was extracted, and
retrieving a program identifier from an audio data record having stored audio data that is a closest match to the received audio data;
identifying members from among the at least two members of a viewer's friends list who are currently viewing a common program, wherein the common program is from among the one or more current programs;
transmitting an invitation to join a video watch party to respective smart televisions of the at least two members of a viewer's friends list, wherein the step of transmitting an invitation to join a video watch party to respective smart televisions of the at least two members of a viewer's friend's list comprises transmitting the invitation to the respective smart televisions of the members from among the at least two members of the viewer's friends list who are currently viewing the common program,
selecting a set of selected members who accepted the invitation from among the members who are currently viewing the common program, and;
transmitting to respective smart televisions of each selected member an instruction to simultaneously display the common program together with a representation of all selected members.

12. The method of claim 11, wherein the representation of the selected member is one selected from an image of the selected member, a graphical representation of the selected member, and a real time video feed of the selected member.

13. The method of claim 11, wherein the instruction to simultaneously display the common program together with a representation of all selected members comprises an instruction to simultaneously display the common program together with a text message display region and a representation of all selected members.

14. The method of claim 11, further comprising:
adjusting a current playback time of the common program for one of the selected members based on a current playback time of the common program for another of the selected members.

15. The method of claim 11, wherein the step of selecting the set of selected members further comprises selecting those members who agree to have a current playback time of the common program adjusted on their respective displays.

16. The method of claim 11, further comprising establishing a peer-to-peer network, wherein the peer-to-peer network comprises the respective smart televisions of the selected members.

17. The method of claim 16, further comprising:
identifying a network manager from among the selected members by receiving data indicating a quality of a connection to the peer-to-peer network for each respective smart television of the selected members; and
identifying a one of the respective smart televisions that has a connection quality greater than others of the respective smart televisions and selecting as the network manager the selected member corresponding to the one of the respective smart televisions.

18. The method of claim 16, further comprising randomly selecting a network manager from among the selected members.

19. The method of claim 16, wherein the step of establishing a peer-to-peer network comprises assigning an IP address to each respective smart television of the selected members.

20. A system for operating a watch party, comprising:
a computer processor unit operatively connected to a smart television display;
a non-transitory computer readable medium having computer executable instructions stored thereon which, when executed by the computer processor, perform the steps of claim 11.

* * * * *